United States Patent [19]

Nishiyama et al.

[11] Patent Number: 4,998,050
[45] Date of Patent: Mar. 5, 1991

[54] SYSTEM AND METHOD FOR TEACHING ROBOTS

[75] Inventors: Toru Nishiyama, Ayase; Tomio Kayama; Kazuya Masuko, both of Yokohama; Masayuki Onodera, Isehara, all of Japan

[73] Assignee: Nissan Motor Co., Ltd., Tokyo, Japan

[21] Appl. No.: 365,643

[22] Filed: Jun. 11, 1989

[30] Foreign Application Priority Data

Jun. 13, 1988 [JP] Japan .................................. 63-143481
Jun. 15, 1988 [JP] Japan .............................. 63-78270[U]
Jun. 20, 1988 [JP] Japan .................................. 63-150058

[51] Int. Cl.$^5$ ............................................. G05B 19/42
[52] U.S. Cl. .................................. 318/568.1; 318/567; 318/568.13; 364/513; 364/191; 901/42
[58] Field of Search .................................. 318/560–574, 318/632, 634; 901/3–9, 18–20, 41–45, 50; 414/728–730; 364/513, 474.35, 474.31

[56] References Cited

U.S. PATENT DOCUMENTS

| | | | |
|---|---|---|---|
| 4,086,522 | 4/1978 | Engelberger et al. | 364/513 X |
| 4,503,507 | 3/1985 | Takeda et al. | 364/513 |
| 4,613,943 | 9/1986 | Miyake et al. | 901/42 X |
| 4,633,385 | 12/1986 | Murata et al. | 901/6 X |
| 4,639,878 | 1/1987 | Day et al. | 364/191 |

FOREIGN PATENT DOCUMENTS 62-110581 of 1987 Japan .

OTHER PUBLICATIONS

Nikkei Mechanical, 1986, vol. 7-28, No. 224, pp. 50-59.

Primary Examiner—Paul Ip
Attorney, Agent, or Firm—Pennie & Edmonds

[57] ABSTRACT

A system for teaching, controlling and monitoring industrial robots includes a storage section storing data describing working positions and motion patterns of the robots, and a teaching section for automatically preparing a teach data of each robot by selecting one of the different working positions and one of the motions patterns for the robot in accordance with the kind of work. The system may further includes a graphic processor for displaying picture images of the robots, their tools and workpieces, and a checking section for searching for robot-robot interference by checking a collection of data describing spaces occupied by the robots, and modifying the teach data to avoid such an interference.

10 Claims, 26 Drawing Sheets

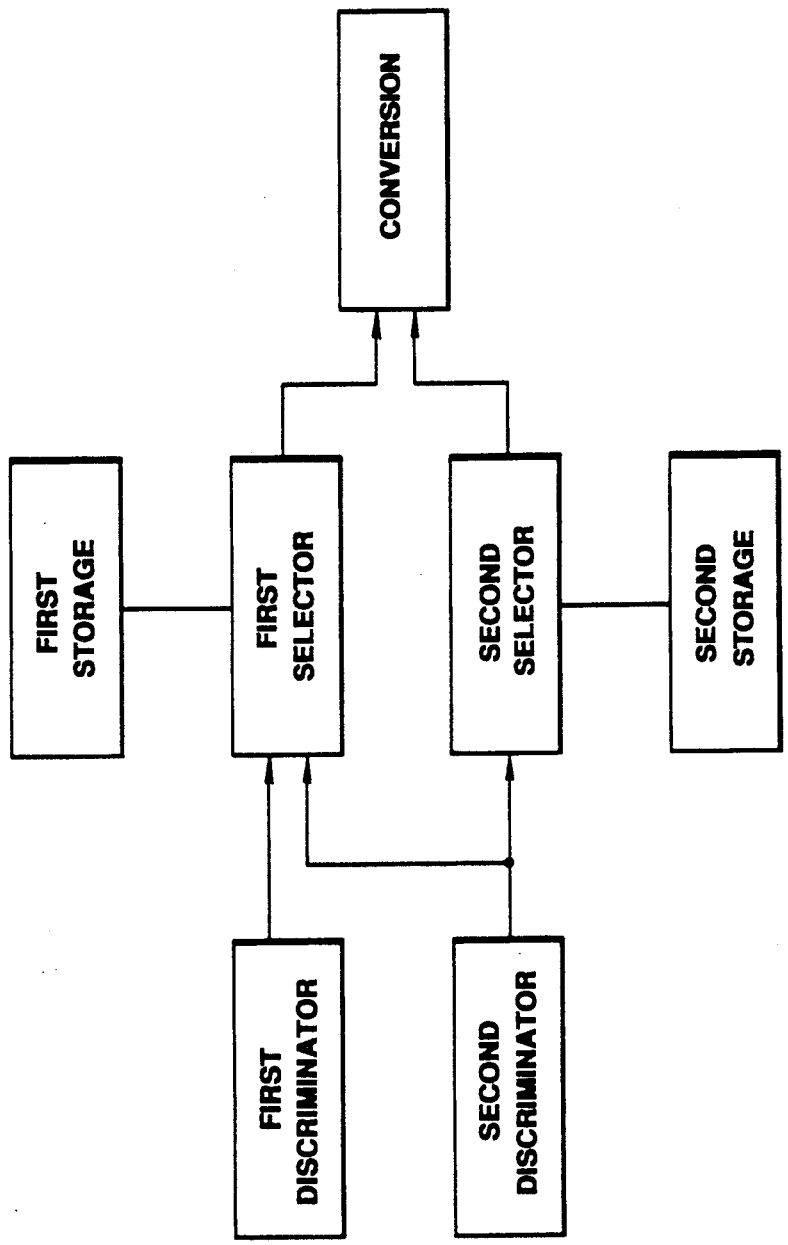

SYSTEM AND METHOD FOR TEACHING ROBOTS

BACKGROUND OF THE INVENTION

The present invention relates to a system or method for teaching, controlling or monitoring robots.

A commonly-assigned, pending U.S. patent application Ser. No. 07/282,190 (and a corresponding British Application No. 8828944.2) shows a recent example of the industrial robot system. On the other hand, a Japanese Patent Provisional Publication No. 62-110581 shows a conventional example.

In conventional robot systems including the above-mentioned conventional example, and even in the above-mentioned recent example, it is very difficult and time-consuming to prepare teach data of all the robots of an assembly station for a variety of products. Furthermore, it is very difficult to observe internal conditions of the assembly station because of the obstruction by manipulators, workpieces and frame structures.

Recently, an off-line teaching technique (Nikkei Mechanical, 1986, Vol. 7-28, No. 224, pages 50-59, published by Nikkei McGraw-Hill Company) is becoming predominant in place of a conventional on-line teaching technique using teach pendant. In this new method, a motion program of a robot such as a positioning locator is prepared by selectively reading out necessary data from a data file of CAD (computer-aided design) which stores data about shapes and positions of workpieces such as vehicle body panels, and robots. However, this teaching method is still troublesome especially in an automobile assembly system which handles a variety of vehicle bodies with many robots.

SUMMARY OF THE INVENTION

It is therefore an object of the present invention to provide system and method for making it easy to teach or control or observe robots.

According to the present invention, a robot control system comprises first and second storage means and means for teaching at least one robot. The first storage means stores position data elements, and the second storage means stores motion pattern elements. The teaching means selects one of the position data elements and one of the motion pattern elements in accordance with a type of work, and prepares a teach data to teach motions to the robot by combining the selected position data element and motion pattern data element.

In particular, the robot control system is suitable to an assembly system for assembling automobiles or other vehicles. In this case, each of the position data elements describing mathematically a position of one robot which may be a working position for spot-welding vehicle body panels, or for positing and holding a body panel, or which may be an original position of the robot. The first storage means stores such position data elements of each robot for different kinds and types of vehicle bodies to be assembled. Each of the motion pattern data elements is descriptive of a pattern of a path to be traveled by one robot. The second storage means stores such pattern data elements for different body types such as a sedan type, hardtop type, a van type and a wagon type. The motion pattern data element of each type is usable for vehicle bodies of different kinds as long as the body type is the same.

BRIEF DESCRIPTION OF THE DRAWINGS

FIG. 26 is a block diagram showing, as one example, a basic structure of the robot teaching system of the first embodiment.

DETAILED DESCRIPTION OF THE INVENTION

FIG. 26 shows a basic arrangement of a robot control system according to a first embodiment of the present invention. As shown in FIG. 26, this system includes at least a first storage means for storing position data elements, a second storage means for storing motion pattern data elements, and a robot teaching means which, in this example, comprises a first selector means for selecting one of said position data elements, a second selector means for selecting one of said motion pattern data elements, and a conversion means for preparing a teach data by using the selected position data element and motion pattern data element. In this example, the control system further comprises a first discriminating means for producing a first identification signal representing a kind of an incoming work to be assembled, and a second discriminating means for producing a second identification signal representing a type of the incoming work. The first selector means is connected with both of the first and second discriminating means, but the second selector means is connected only with the second discriminating means.

The first embodiment of the present invention is concretely shown in FIGS. 1-11.

Figure 1:
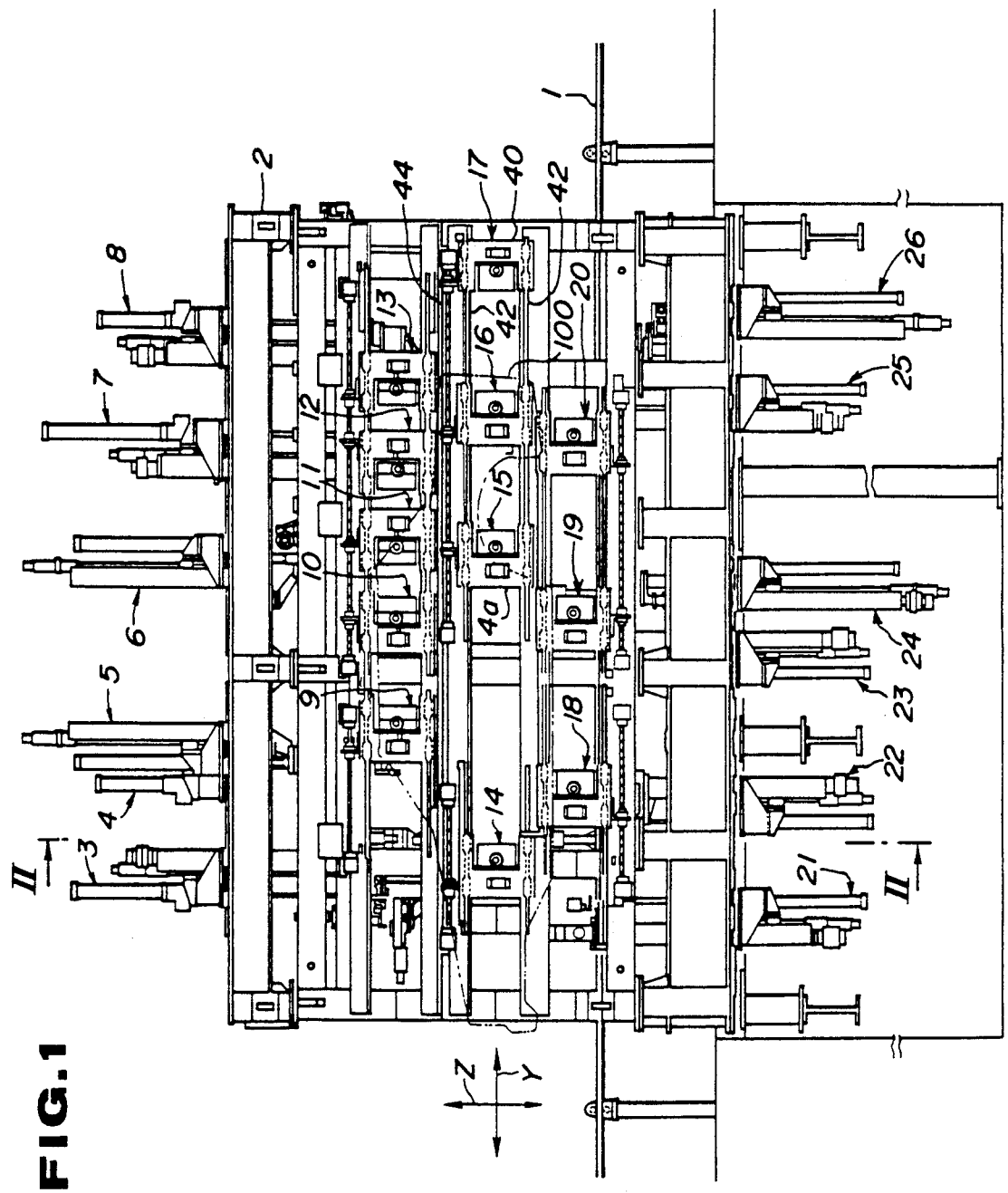
FIG. 1 is a side view showing a vehicle body main body assembly system of a first embodiment of the present invention.
Figure 2:
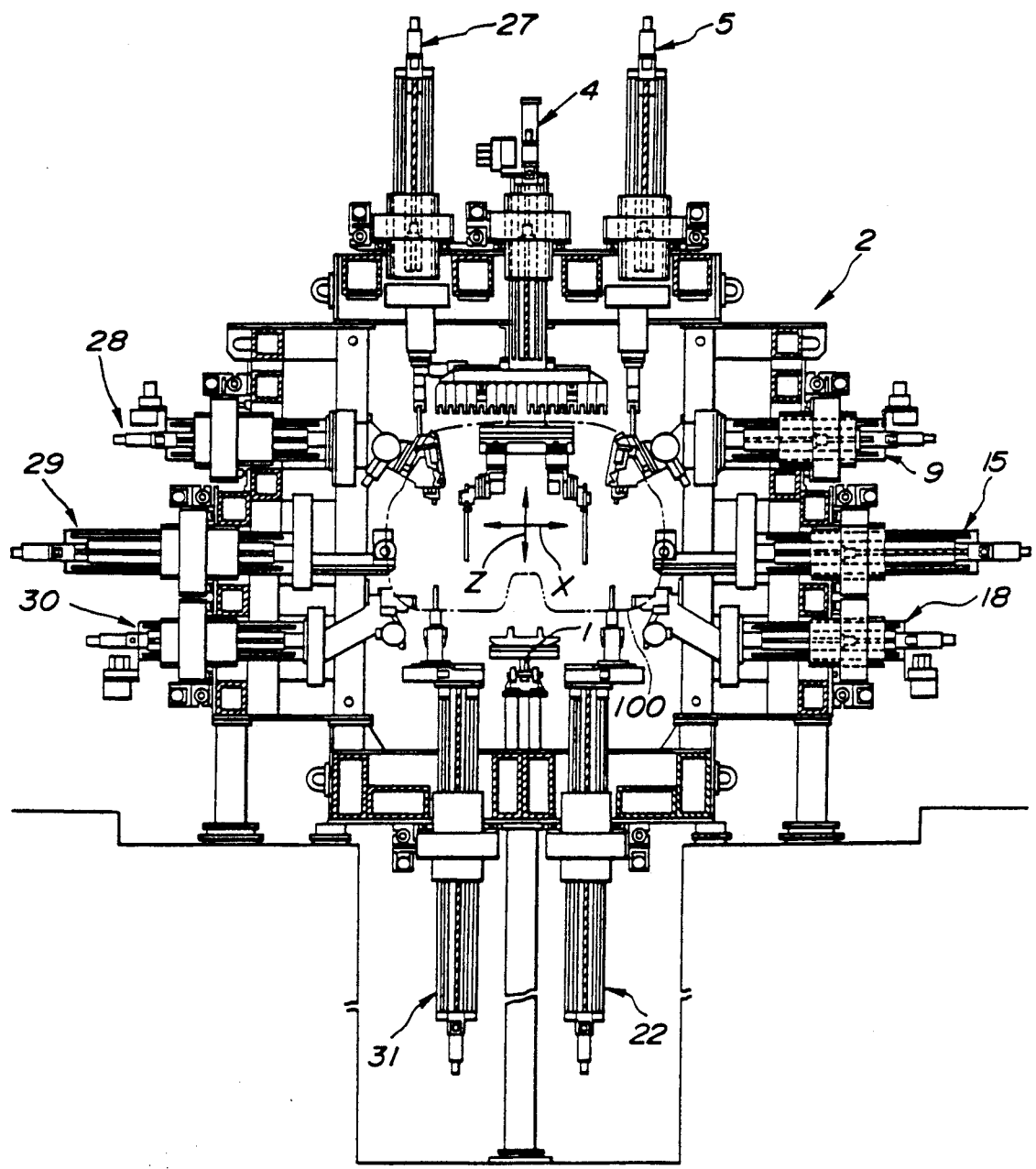
FIG. 2 is a sectional view taken across a line II—II of FIG. 1.

As shown in the side view of FIG. 1 and the sectional view of FIG. 2, a main body assembly system of this embodiment has a frame structure 2 which has a rectangular section, and surrounds a shuttle bar 1. The shuttle bar 1 is used for conveying a work consisting of a plurality of body panels constituting a main vehicle body, to a provisional assembly station in a vehicle body assembly line, and conveying a provisionally assembled main body away from the provisional assembly station.

The assembly system further has a plurality of robots 3-31 which are, in this embodiment, of a rectangular (orthogonal) coordinate type. The robots 3-31 are mounted on the frame structure 2, and distributed, approximately in a manner of bilateral symmetry, in top, bottom, left and right side surfaces of the frame structures 2 which all extend in parallel to the shuttle bar 1.

All the robots 3-31 are approximately identical in construction. FIG. 4 shows the robot 18 as an example. The robot 18 is provided in one side of the frame structure 2 as shown in FIG. 2, and used for locating or positioning a side sill portion 101a of a body side panel 101 of a vehicle main body 100 shown in FIG. 3. The robot 18 has a base 40, an arm 50, two movable wrist brackets 60 and 61, a base drive mechanism 41, an arm drive mechanism 51, and two bracket drive mechanisms 62. The base drive mechanism 51 can cause the base 40 to move relative of the frame structure 2 along a Y direction which is horizontal, and parallel to the longitudinal direction of the shuttle bar 1. The Y direction (or axis) is shown by an arrow Y in FIGS. 1, 3, 5 and 6. In FIG. 4, the Y direction is perpendicular to the surface of the paper of FIG. 4. The arm drive mechanism 51 can move the robot arm 50 relative to the base 40 along an X direction which is horizontal and perpendicular to the Y direction. The X direction (or axis) is shown by an arrow X in FIG. 4 and other figures. The two bracket drive mechanisms 62 is capable of moving, respectively, the two wrist brackets 60 and 61 relative to the arm 50 in a Z direction (or axis) which is vertical. The Z direction is shown by an arrow Z in FIG. 4 and other figures. The base drive mechanism 41 moves the base 40 along horizontal rails 42 fixed to the frame structure 2. Circulating ball type sliders 43 fixed to the base 40 are in engagement with the rails 42, respectively. A ball nut 45 supported on the base 40 is fitted over a ball screw shaft 44 which is fixed to the frame structure 2. A servomotor 46 of the base drive mechanism 41 is provided in the base 40, and drivingly connected with the ball nut 45 through a coupling so that the servomotor 46 can rotate the ball nut 45.

The arm drive mechanism 51 has guide rails 52 fixed to the arm 50, and circulating ball type sliders 53 which are fixed to the base 40 and engaged with the guide rails 52, respectively. A ball screw shaft 54 is mounted on the arm 50 between the guide rails 52, and a ball nut 55 is fixed to the base 40. The screw shaft 54 is screwed in the ball nut 55, and drivingly connected with a servomotor 56 of the arm drive mechanism 51 through a coupling. The servo motor 56 is provided in the arm 50. Thus, the ball screw shaft 54 is rotated by the servomotor 56.

Each of the wrist bracket drive mechanism 62 includes two vertically extending guide rails 63 fixed to a forward end of the arm 50, circulating ball type sliders which are fixed to a bracket holder 64, and engaged with the guide rails 63, a ball screw shaft 66 which is supported on the forward end of the arm 50 between the guide rails 63, a ball nut 67 which is fixed to the bracket holder 64 and mounted on the screw rod 66, and a servomotor 68 which is provided in the forward end of the arm 50 and drivingly connected with the ball screw shaft 66 through a coupling so that the servomotor 68 can rotate the ball screw shaft 66.

In this way, the base drive mechanism 41 can move the robot base 40 in the longitudinal Y direction, the arm drive mechanism 51 can move the arm 50 in the lateral X direction, the first bracket drive mechanism 62 can move the first wrist bracket 60 in the vertical Z direction, and the second bracket drive mechanism 62 can move the second bracket 61 in the vertical Z direction.

Figure 5:
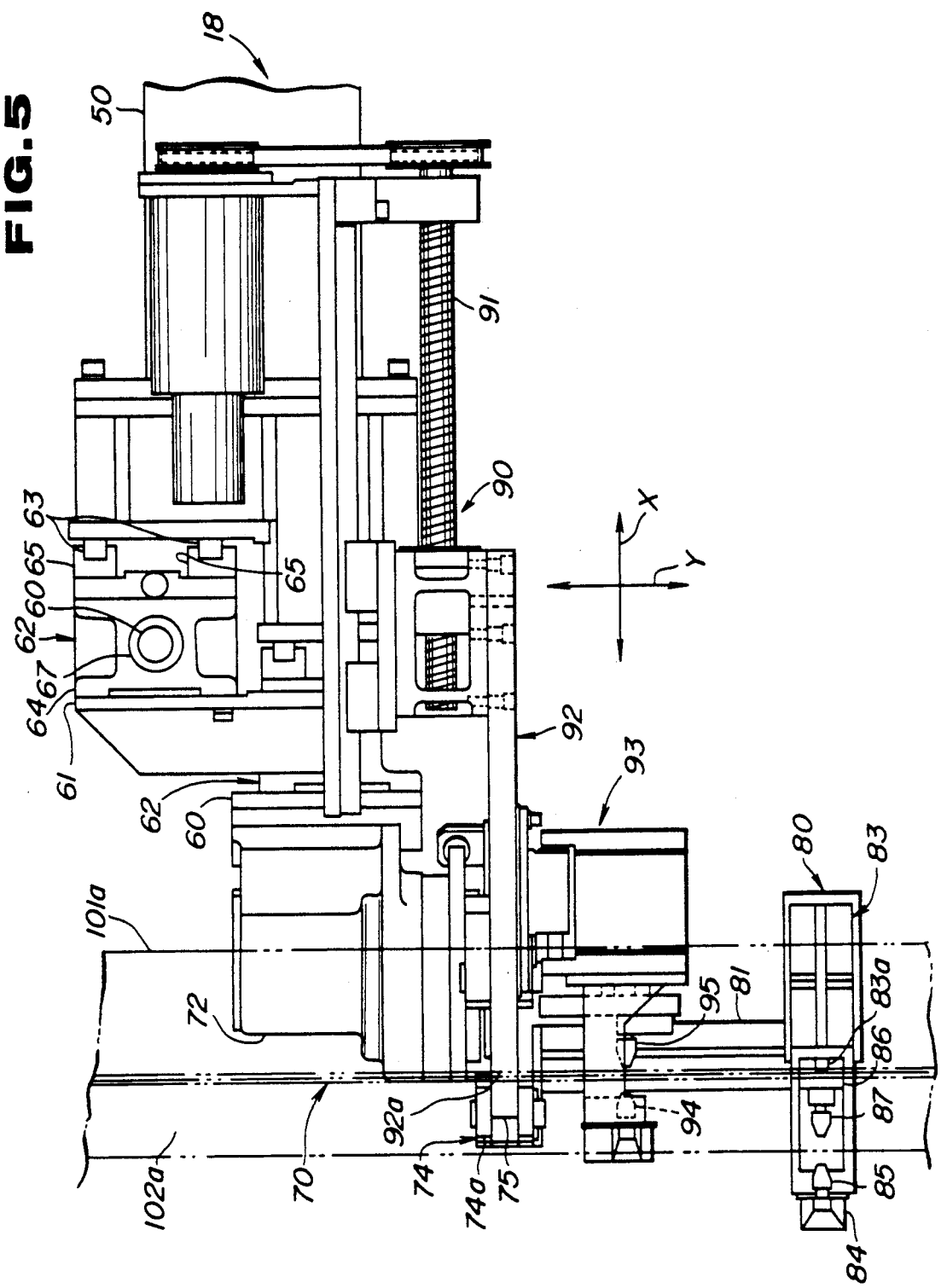
FIG. 5 is a plan view of a hand portion of the robot shown in FIG. 4.
Figure 6:
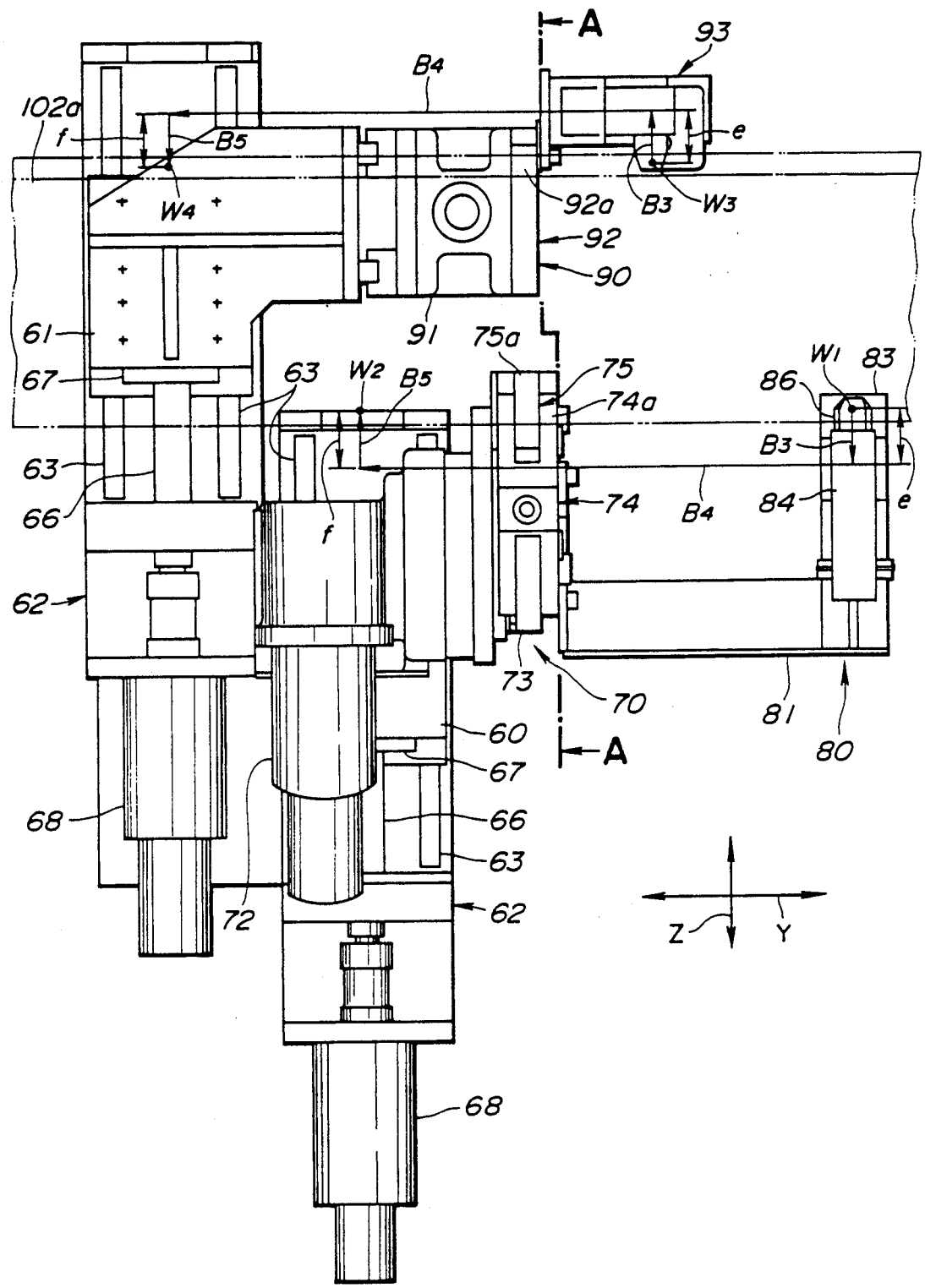
FIG. 6 is a side view of the hand portion of the robot shown in FIG. 4.
Figure 7:
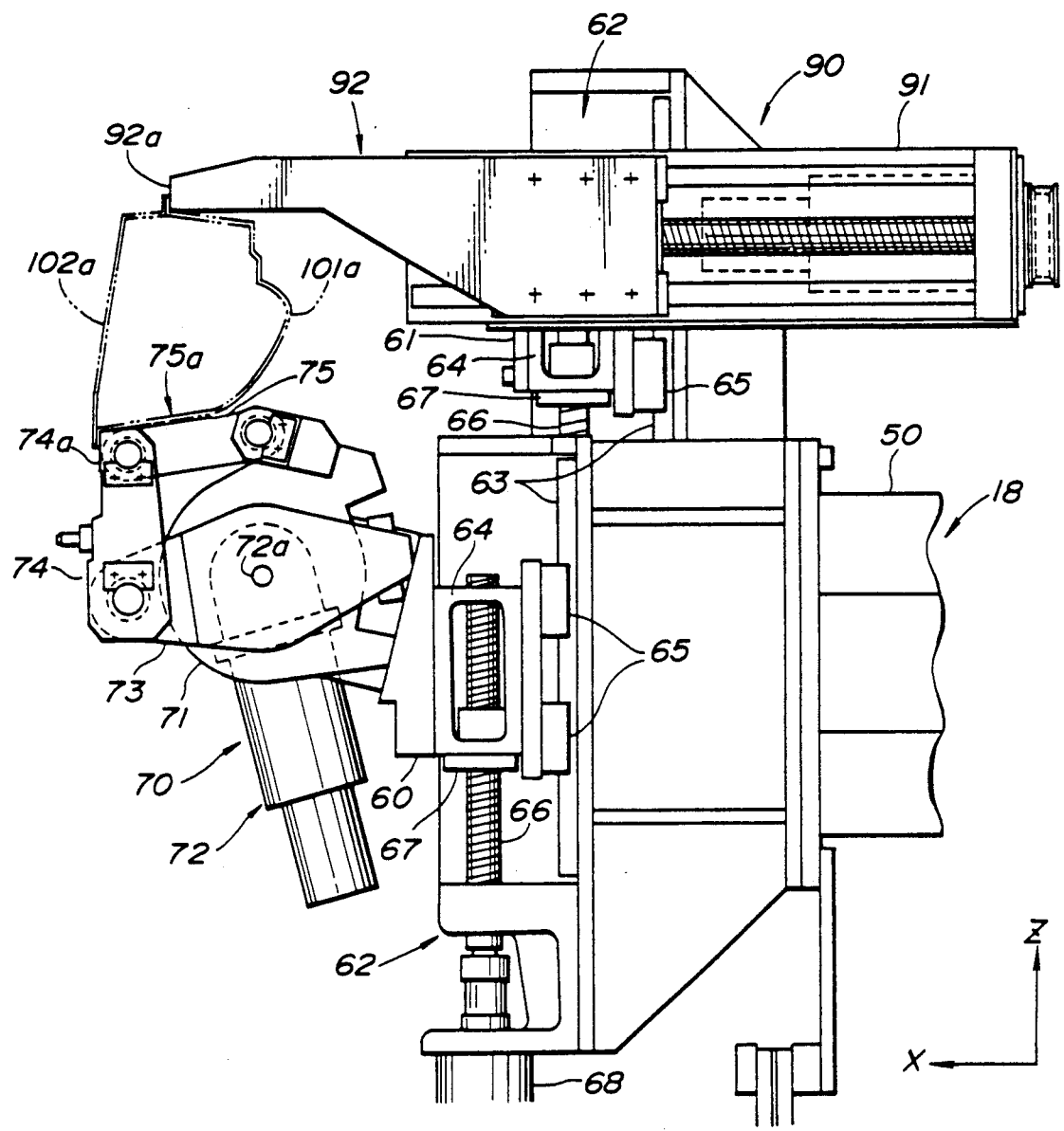
FIG. 7 is a view of the hand of the robot of FIG. 4, as viewed in the direction shown by arrows A in FIG. 6.

The first wrist bracket 60 carries a lower positioning tool 70 and a lower welding gun 80, and the second wrist bracket 61 carries an upper positioning tool 90 and an upper welding gun 93, as shown in FIGS. 5, 6 and 7. Thus, each wrist bracke of this example has two hands.

The lower positioning tool 70 is a device for positioning a lower portion of the side sill 102a of a main floor panel 102. The lower welding gun 80 is used for joining the lower portions of the side sills 101a and 102a by spot-welding.

The lower positioning tool 70 has a gauge holder 71 fixed to the movable wrist bracket 60, a servomotor 72 attached to the gauge holder 71, a gauge drive arm 73 connected with an output shaft 72a of the servomotor 72, and gauge plates 74 and 75. The gauge plates 74 and 75 are pivotally connected with the gauge drive arm 73 and the gauge holder 71, respectively, and both gauge plates are connected together to form a parallel link.

This positioning tool 70 can vary an angle of a gauge surface 75a of the gauge plate 75 from the horizontal while holding a gauge surface 74a of the gauauge plate 74 vertical, by rotating the gauge drive arm 73 with the servomotor 72. Therefore, this positioning tool 70 can position the lower end of each of different side sills of various shapes.

The lower spot-welding gun 80 has electrode tips 85 and 87. An air cylinder 83 is supported on a bracket 81 fixed to the gauge plate 74, through an equalizer mechanism 82 permitting movement along the X direction. The electrode tip 85 is attached to a main body of the air cylinder 83 through an arm 84, and the electrode tip 87 is attached to a piston rod 83a of the air cylinder 83 through an arm 86. Both electrode tips 85 and 87 confront each other. The arms 84 and 86 are connected with a welding transformer by feeder cables.

When an air pressure is supplied to the air cylinder 83, the electrode tip 87 advances toward the opposite electrode tip 85 until the electrode tip 87 bumps against the workpiece. Then, the main body of the air cylinder 83 is moved backwardly by the action of the equalizer mechanism 82. Therefore, the electrode tips 85 and 87 clamp downwardly projecting flanges of the side sill portions 101a and 102 held at the predetermined position by the locator 70 and others, and then spot-weld the lower portions of the side sills 101a and 102a.

The upper positioning tool 90 carried by the second movable wrist bracket 61 serves as a device for positioning an upper portion of the side sill 101a of the side panel 101 with respect to the upper portion of the side sill 102a of the main floor panel 102. The upper welding gun 93 carried by the second bracket 61 is used for spot-welding the upper portions of the side sills 101a and 102a.

The upper positioning tool 90 has a gauge plate 92 which can be moved along the X direction with respect to the gauge plates 74 and 75 of the lower positioning tool 70 by a drive mechanism similar to the bracket drive mechanism 70. (In this drive mechanism, however, a servomotor is drivingly connected to a ball screw shaft by a belt drive.) Therefore, this positioning tool 90 can be used for side sills of various shapes. A gauge surface 92a of the gauge plate 92 is moved along the X axis to a correct position according to a predetermined side sill shape.

The upper spot-welding gun 93 is sabstantially identical in construction to the lower welding gun 80. The upper welding gun 93 has electrode tips 94 and 95 which can clamp the upper flanges of the side sills 101a and 102a positioned by the upper locator 90 and others, and spot-weld the upper flanges of the side sill portions 101a and 102a.

Each robot provided on the top and left and right sides of the frame structure 2 has at least one of various hands. The hand may be a positioning tool similar to the positioning tool 70 or 90 of the robot 18, or may be a positioning tool which is adaptable to various workpieces by selectively placing one of gauge plates of different kinds, or may be a spot-welding gun which is similar to the welding gun 80, or of some other conventional type. Each robot provided in the bottom of the frame structure 2 has at least one hand which may be a locate pin having a latch mechanism or may be a welding gun. In each robot, the hand is mounted on a movable wrist bracket at the forward end of the robot arm.

A robot teaching system (or method) of this embodiment is arranged to make a computer 101 for CAD (shown in FIG. 8) prepare teach data for each robot, and teach the teach data directly to a control unit 120 of the main body assembly system. The teach data of each robot is data for causing the robot to provisionally assemble a vehicle main body in cooperation with the other robots, without interfering with any of the other robots.

Figure 8:
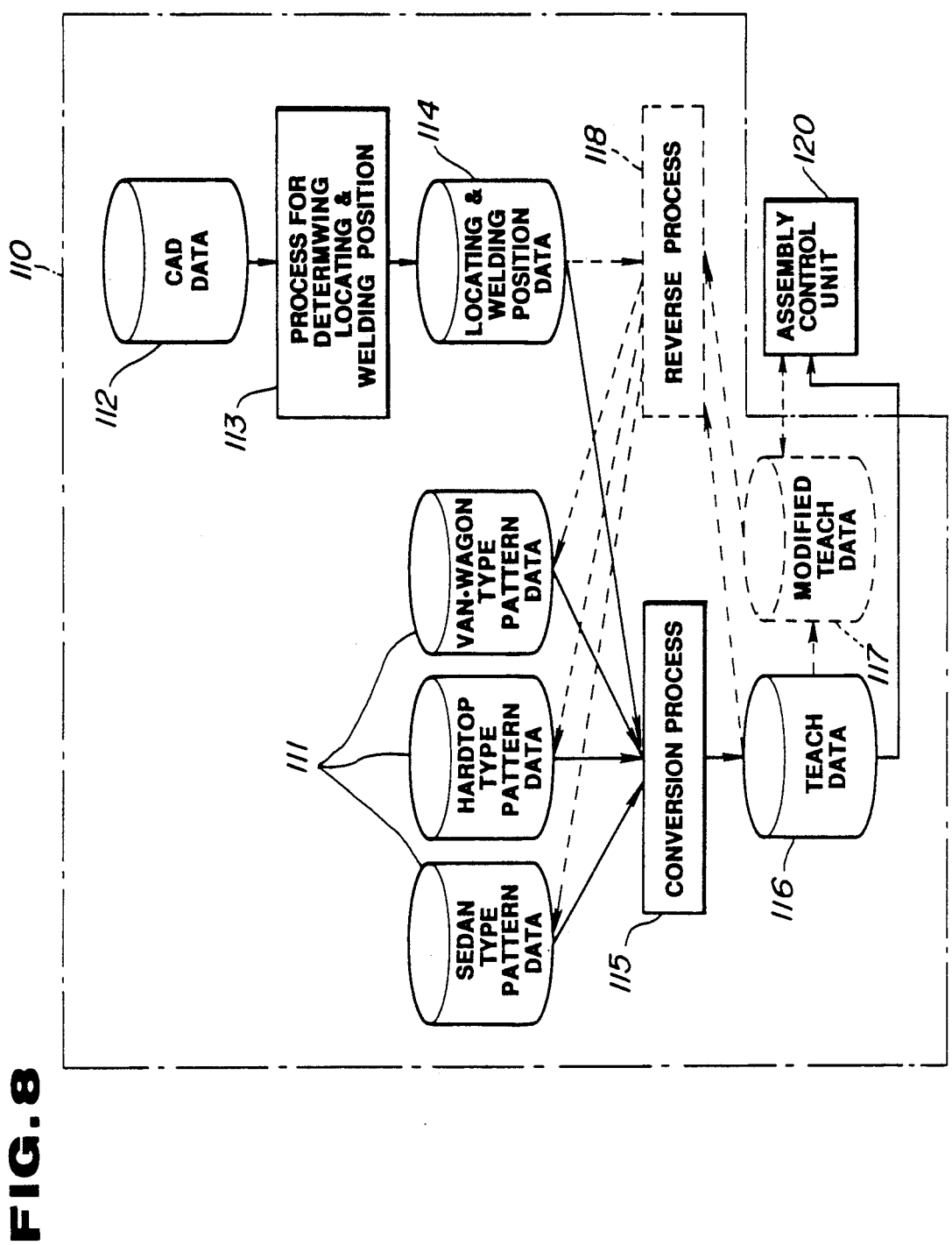
FIG. 8 is a schematic view showing a procedure of the first embodiment for preparing a robot teach data.

In preparing the teach data, standard motion pattern data 111 is preliminarily inputted into the CAD computer 110 used for vehicle body design. The standard motion pattern data 111 consists of two or more parts each of which is prepared uniquely for one of different vehicle body types, and each of which is common to different vehicle kinds (or makes) of vehicles to be assembled in this assembly system. In this embodiment, the vehicle body types are sedan type, hardtop type and van/wagon type, and there are a sedan type standard motion pattern data, a hardtop type standard motion pattern data, and a van/wagon type standard motion pattern data, as shown in FIG. 8. Vehicle of each kind are usually identified by the same name given by the maker, and each vehicle kind includes one or more body types.

Figure 9:
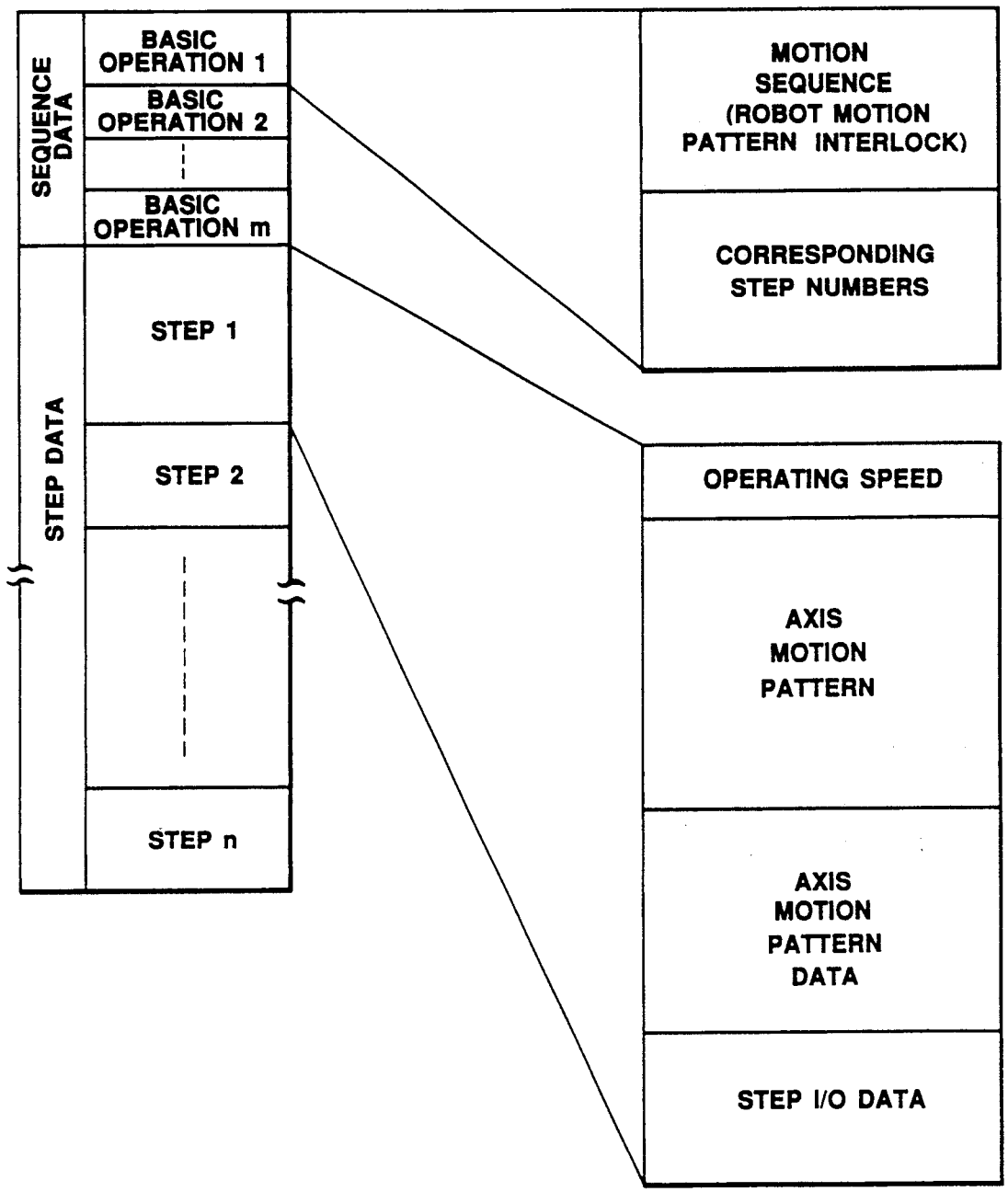
FIG. 9 is a schematic view showing the structure of standard motion pattern data used in the first embodiment.

As shown in FIG. 9, each of the three parts of the standard motion pattern data 111 includes a plurality of sets each of which consists of sequence data 121 and step data 122, and is prepared for a unique one of the robots. These sets for each vehicle body type are assigned to the robots so that each set corresponds to a unique one of the robots. The sequence data of each set includes a plurality of blocks which are prepared, respectively, for basic operations required for the provisional main body assembly. The step data 122 is data for performing these basic operations.

Each block of the sequence data 121 for a unique one of the basic operations includes a description of motion sequence indicating robot motion pattern and interlock between robots or between a robot and another device (such as the control unit of the assembly line for controlling the shuttle conveyor 1), and a description of numbers of corresponding steps of the step data (, for example, from No. i to No. j) corresponding to the motion sequence. The step data 122 includes a plurality of steps, each of which includes descriptions of operating speed of the robot, motion pattern of each movable axis (for example, the base drive mechanism 41, arm drive mechanism 51, bracket drive mechanisms 62 and positioning device 70), data for the motion pattern of each axis, and step interface (I/O) for interlock and actuation of drive means, such as the air cylinder, other than the servomotors.

In this embodiment, there are eight basic operations, change of vehicle kinds, advance to an approach position, first positioning, second positioning, third positioning, welding, return to the approach position, and return to an original position.

In the first basic operation of vehicle kind change, the robots wait for a signal from the control unit of the assembly line indicating a start of forward movement of the shuttle conveyor, and a start signal of the assembly system. Thereafter, the robots on the bottom of the frame structure 2 put the locate pins at respective waiting positions, and the robots on top and both sides put the positioning tools at respective waiting positions. Furthermore, in the positioning tools, gauge plates of proper shapes are selected according to the vehicle kind of the main body to be assembled.

In this first basic operation, therefore, the robot motion patterns are as follows: In each bottom robot provided on the bottom of the frame structure 2, for example, the locate pin is moved from the original position to the locating position along the X and Y directions (in the horizontal plane), but held at the original position along the Z axis. (That is, the locate pin is moved only in the horizontal plane without being moved vertically.) In the lateral robot 18 for positioning the side sill portion 101a and the lateral robot for positioning a rear fender portion 101b (shown in FIG. 3) of the body side panel 101, for example, each positioning device is moved from the original position to the locating position via a predetermined path along the Y and Z directions (in the vertical plane), but held at the original position along the X direction. The movable axis motion pattern of each step data is designed to cause these movements. In this embodiment, the original position of each robot is fixed, and held unchanged irrespective of change in vehicle kind and type.

In the second basic operation of advance to the approach position, the robots waits until the assembly line control unit delivers a signal indicating an arrival of the shuttle conveyor at a predetermined forward limit position. Then, the bottom robots provided in the bottom of the frame structure 2 are caused to put their positioning devices at their respective approach positions at which the devices are ready for positioning.

In this assembly line, the main floor panel 102, body side panels 101 and other workpieces are preliminarily assembled in a rough and temporary manner at a preceding station, and then brought to this provisional assembly station in such a state that the robots can assemble the workpieces into the vehicle main body 100 by moving each workpiece only slightly, and welding the workpieces.

Figure 10A:
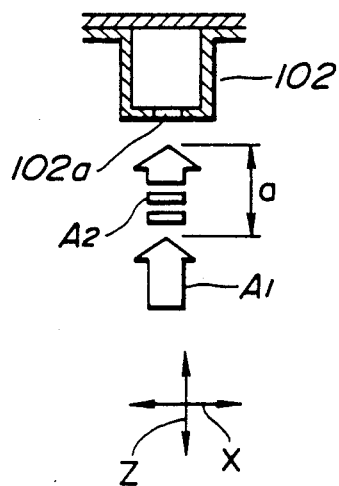
FIGS. 10A, 10B and 10C are views for illustrating paths of hands of robots according to the standard pattern data of the first embodiment.
Figure 10B:
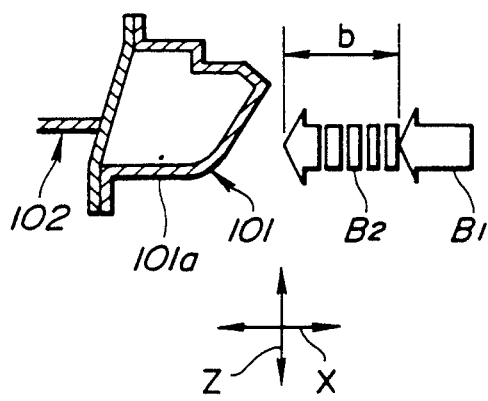
Figure 10C:
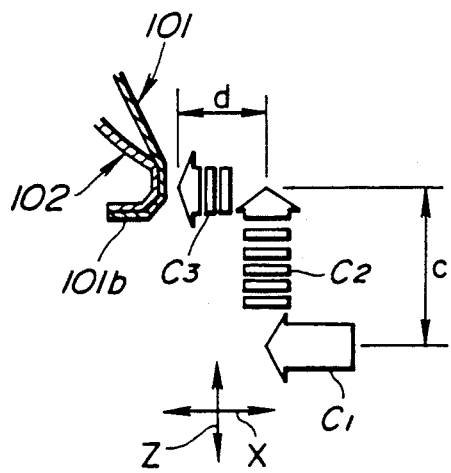

In the advance to the approach position, therefore, the robot motion patterns are as follows:

In the bottom robots, for example, each locate pin is moved upwardly along the Z direction from its waiting position to its approach position as shown by an arrow $A_1$ in FIG. 10A. This approach position is just below the locating position, and at a predetermined distance "a" apart from the locating position. At the approach position, the locate pin does not yet reach a corresponding locate hole 102a formed in the main floor panel 102. In the lateral robot 18 situated on the side of the frame structure 2, each positioning device is moved laterally along the X direction from its waiting position to its approach position, as shown by arrow $B_1$ in FIG. 10B. This approach position is at a predetermined distance "b" apart from the locating position along the X direction. In the lateral robot on one side of the frame structure, for positioning the rear fender portion 101b, the positioning device is moved laterally from its waiting position to its approach position, as shown by an arrow $C_1$ in FIG. 10C. This approach position is at a predetermined distance "c" downwardly along the Z axis, and at a predetermined distance "d" laterally along the X direction apart from the locating position, as shown in FIG. 10C. The movable axis motion patterns of each step are designed to cause these movements, and the axis motion pattern data indicates the predetermined distances a,b,c.

The third basic operation of the first positioning is as follows: In the bottom robots, each locate pin is moved upwardly to the locating position, and inserted into the locate hole 102a of the main floor panel 102. Therefore, the main floor panel 102 is lifted up from the shuttle conveyor 1, and positioned at a predetermined correct position. Furthermore, the main floor panel 102 is firmly clamped at the predetermined correct position by the before-mentioned latch mechanisms. As to the lateral robots on each side, only the robot for positioning the rear fender portion 101 is moved, and the other robots remain at rest. In the robot for positioning the rear fender portion 101, the positioning tool is moved upwardly with the upward movement of the main floor panel 102. Then, a signal to return the shuttle conveyor is delivered to the assembly line control unit.

Therefore, the robot motion patterns are as follows: In the bottom robots, each locate pin is moved upwardly through the distance "a" from the approach position to the locating positionn, as shown by arrow $A_2$ in FIG. 10A. In the lateral robot on each side for positioning the rear fender portion 101b, the positioning tool is moved upwardly along the Z direction from the approach position to a lift-up position through the distance "c", as shown by an arrow $C_2$ in FIG. 10C. The interlock is arranged to cause the locate pins to lift up various portions of the main floor panel 102 simultaneously in unison and cause the rear fender portions 101b on the left and right sides to be lifted up simultaneously with each other and with the upward movement of the main floor panel 102 by synchronizing all the robots for moving the locate pins, and the robots for moving the positioning tools. Furthermore, the shuttle conveyor return signal is generated. The axis motion patterns of each step data are arranged to cause these movements, and the axis motion pattern data indicates the distances a, c. The step I/O data is designed to synchronize the robots, and to actuate the latch mechanisms.

The fourth basic operation of second position is as follows: The robots wait until the main floor panel 102 reaches an upper limit position. Thereafter, in the lateral robots for positioning the body side panel 101 on each side, the positioning tools are moved toward the center line of the vehicle body as far as the respective locating positions. Therefore, the left and right side panels 101 are correctly positioned on both sides of the main floor panel. Then, the side panels 101 are firmly clamped by clamp mechanism which are provided in the positioning tools and actuated by air cylinders. In the topside robots located on the top of the frame structure 2, their positioning tools are placed on respective approach positions, and held ready for moving to the locating positions.

Therefore, the robot motion patterns in this basic operation are as follows: In the lateral robot 18, for example, each positioning tool is moved laterally along the X direction from the approach position to the locating position through the distance "b", as shown by an arrow $B_2$ in FIG. 10B. Therefore, the side sill portion 101a on each side is pushed toward the center of the vehicle body, and positioned correctly. In the lateral robots for positioning the rear fender portions 101b, each positioning tool is moved laterally along the X direction from the lift-up position to the locating position through the distance "d", as shown by an arrow $C_3$ in FIG. 10C. Therefore, the rear fender portion 101b on each side is pushed against the main floor panel 102, and held at the correct position. The interlock is designed to synchronize all the robots for moving the positioning tools so that the robots can push and position various portions of the each side panel 101 simultaneously. The axis motion patterns of each step data is arranged to cause these movements, the axis motion pattern data is arranged to indicates the distances "b" and "d", and the step I/O data is arranged to cause waiting for the termination of movements of the bottom robots, synchronization of the robots, and actuation of the clamp mechanisms.

In the fifth basic operation of third positioning, after the body side panels 101 have been correctly positioned, each positioning tool of the topside robots provided on the top of the frame structure 2 is moved from its approach position to its locating position. Therefore, roof rails, air box, shelf panel, rear panel and other workpieces lying between the left and right body side panels 101 are positioned, and held at correct positions. Then, a weld start signal is produced to start the welding operation.

In the sixth basic operation of welding, the robots having only the welding gun and the robots having both the welding gun and the positioning tool are caused to spot-weld the workpieces which are positioned and firmly held as the result of the first, second and third positioning operations. Thus the workpieces are provisionally assembled into the main body 100.

The robot motion patterns in this welding operation are designed as follows: In the lateral robot 18 of this embodiment, for example, each of the lower and upper welding guns 80 and 93 is moved away from its first weld position $W_1$ or $W_3$ along the vertical Z direction through a predetermined distance "e", as shown by an arrow $B_3$ in FIG. 6, then moved longitudinally along the Y direction as shown by an arrow $B_4$ and finally moved vertically along the Z direction to a second weld position $W_2$ or $W_4$ through a predetermined distance "f", as shown by an arrow $B_5$. When these movements are employed, the axis motion pattern data of the step data is arranged to indicate the distances "e" and "f".

In the seventh basic operation of return to the approach position, the clamp mechanisms are released after the completion of the spot welding, and then each positioning tool of the top and lateral robots is returned to its approach position by the path in the reverse direction. In the eighth basic operation of return to the original position, following the seventh operation, each locate pin of the bottom robots is returned to the original position via the approach position, and each positioning tool of the topside and lateral robots is returned to its original position. Therefore, the provisionally assembled vehicle main body 100 is placed on the shuttle conveyor 1. Thereafter, a signal is sent to the assembly line control unit to command a forward movement of the shuttle conveyor 1.

With the above-mentioned standard motion pattern data 111, the robot control system can automatically determine proper travel paths by being provided with only the data about the position coordinates of the original positions, locating positions, welding positions and other positions. These paths can be made to have a common pattern among the vehicles which are of the same type, and have approximately identical vehicle body constructions.

Figure 3:
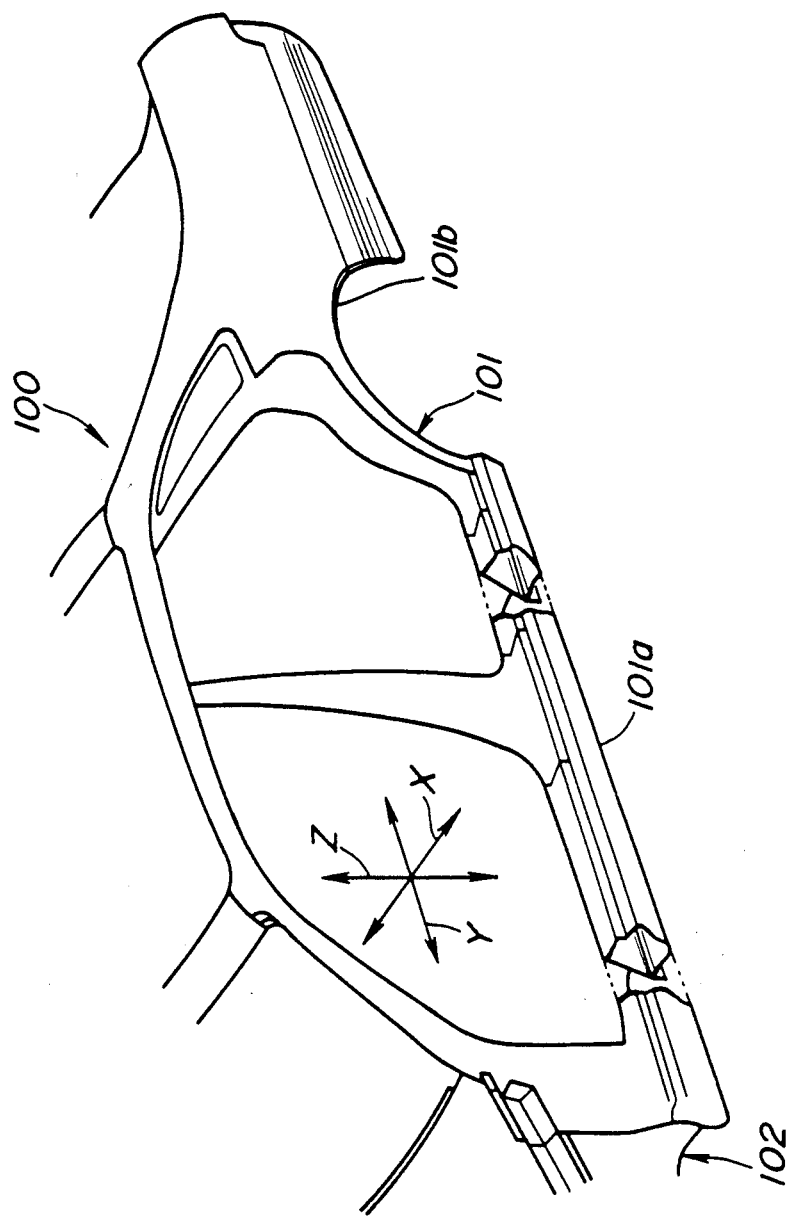
FIG. 3 is a perspective view of a vehicle main body to be assembled in the assembly system of FIG. 1.
Figure 4:
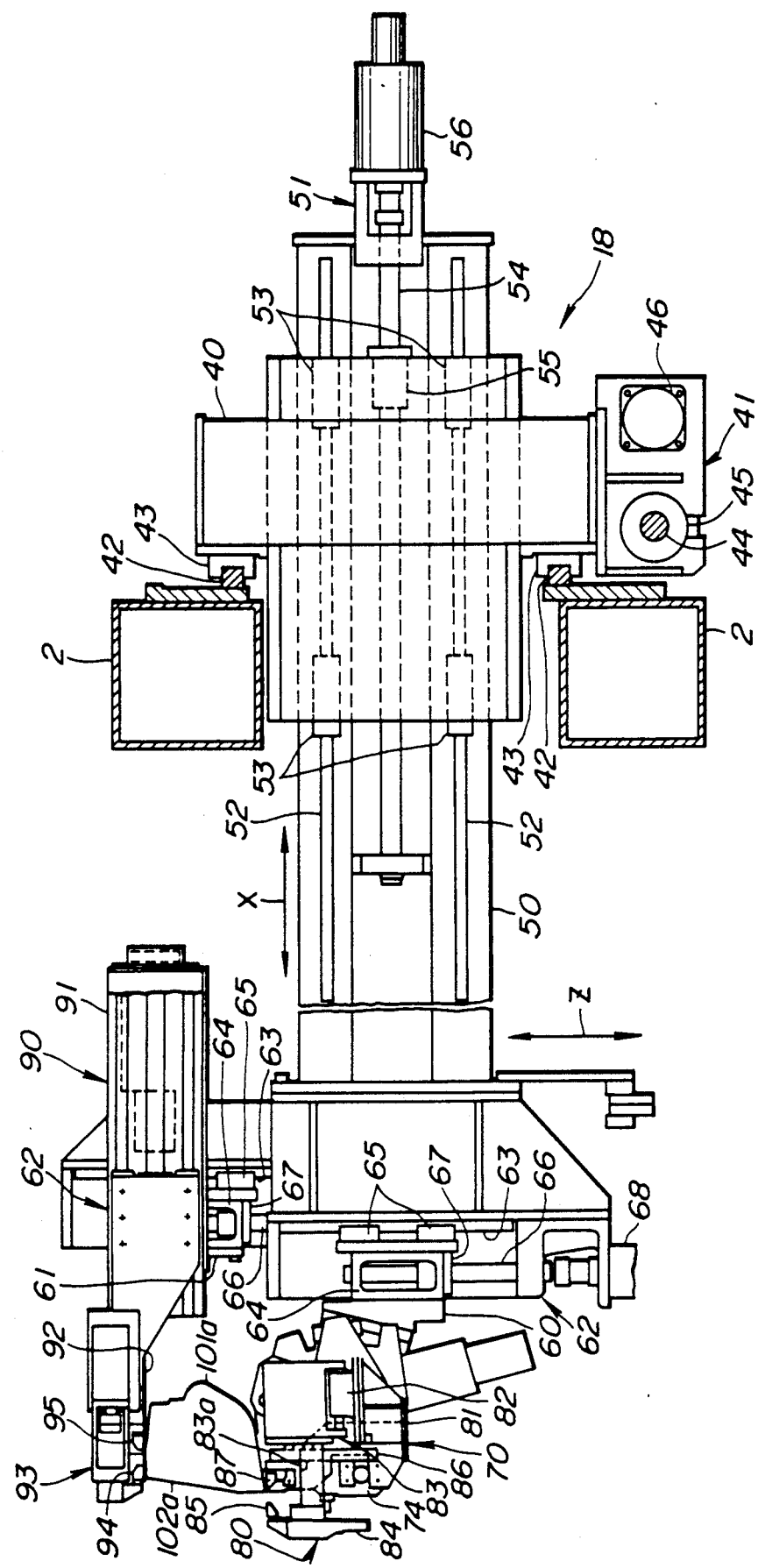
FIG. 4 is a front elevation showing one of robots of the assembly system shown in FIG. 1.

For example, the path of the positioning tool for positioning the rear upper portion of each body side panel for the sedan type shown in FIG. 3 is different from that for the van/wagon type. In the sedan type, the positioning of the rear upper portion of the side panel is performed by applying a gauge portion to the upper portion of the rear pillar and the upper end of the trunk opening, from above. Therefore, the pattern for the sedan type is such that the positioning tool is first moved laterally to a position above the locating position, and then moved downwardly to the locating position. In the van/wagon type, however, the positioning is performed by applying the gauge portion from below to the upper portion of a frame of a rear side window. Therefore, in the pattern for the van/wagon type, the positioning tool is first move laterally to a position below the locating position, and then moved upwardly to the locating position. Such a pattern is common to various kinds of the vehicle as long as the vehicle body type is the same. The patterns of paths to the other locating and welding positions can be determined in the same manner according to the vehicle body construction, that is, the vehicle body type. In this way, each robot motion pattern is the form of a path of a predetermined point of the robot which is described by a continuous line consisting of line segments connected end to end. In this embodiment, the line segments are straight, and connected at right angles or in alignment.

Furthermore, when the travel paths are patternized, it is also possible to patternize the timings of interlocks between robots in operations liable to incur interference between robots, and interlocks between robots and other devices.

The CAD computer 110 having the thus-arranged standard motion pattern data is notified of the kind and type of a vehicle to be assembled, and then prepares the teach data in the following process.

First, the CAD computer 110 selectively takes out, from CAD data 112, information on the locating and welding positions, and cross sectional shapes at the locating positions, of a vehicle body of the specified kind and type. These positions and cross sectional shapes are preliminarily determined at the time of vehicle body design by the CAD computer 110, and stored in the CAD data 112. The storage device for CAD data 112 stores the locating and welding positions and cross sectional shapes of all the vehicle kinds and all the vehicle types employed in this assembly line. Then, the CAD computer 110 performs a process 113 for determining locating and welding positions by using these locating and welding positions in the vehicle body, taken out from the CAD data 112, and by so doing produces locating and welding position data 114 indicating the locating and welding positions in the coordinate system of the main body assembly system.

Then, the CAD computer 110 produces teach data 116 by performing a conversion process 115 by the use of the thus-obtained locating and welding position data 114, data on the predetermined original positions of the robots, and the standard motion pattern data 111 of the specified vehicle type.

Figure 11:
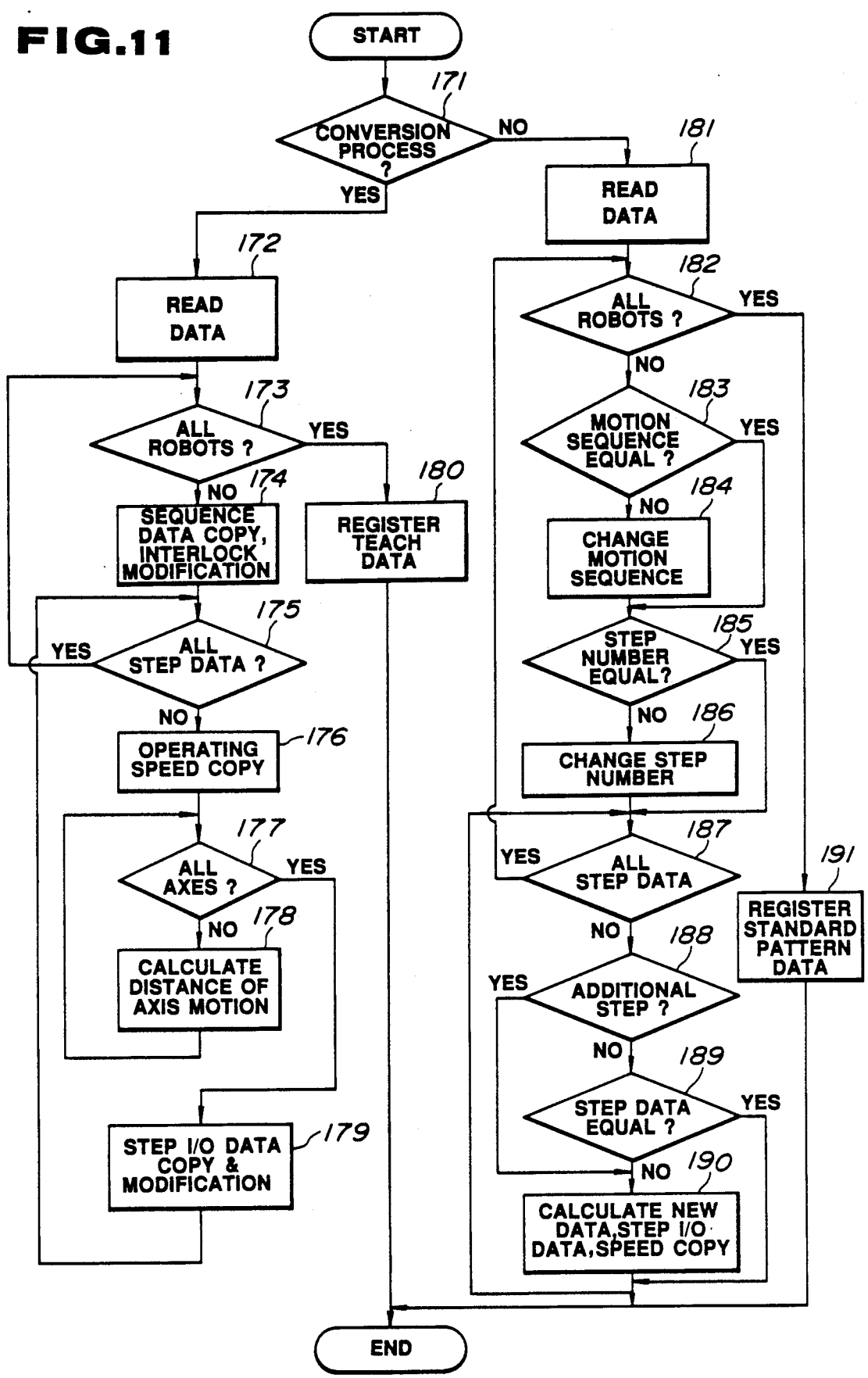
FIG. 11 is a flowchart showing a program for conversion process and inversion process according to the first embodiment.

FIG. 11 is a flowchart for showing the conversion process 115, and a reverse process 118 for modifying the standard motion pattern 111. Steps 172-180 correspond to the conversion process 115, and steps 181-191 correspond to the reverse process 118.

When the conversion process 115 is to be performed, the computer 110 proceeds from a step 171 to the step 172. At the step 172, the computer 110 reads the locating and welding position data 114, the above-mentioned original position data of the robots, and the standard motion pattern data 111 of the selected vehicle type. At the steps 171 and 174 following the step 172, the computer 110 copies the sequence data 121 (shown in FIG. 9) of a predetermined one of the robots, and modifies, if necessary, the contents of the interlock of the sequence data 121 in accordance with the specified vehicle kind by using predetermined conditions.

Then, the computer 110 copies the operating speed of a predetermined part of the step data 122 at the step 176, and calculates the distance of each movement of each movable axis at the step 178 by using the above-mentioned locating and welding position data, original position data, axis motion pattern, and axis motion pattern data. At the step 179, the computer 110 copies the step I/O data, and modifies, if necessary, the step I/O data in conformity with the specified vehicle kind by using predetermined conditions. The steps 177 and 178 are repeated until it is determined at the step 177 that the operation of the step 178 is completed for all the axes. The steps 175-179 are repeated until it is determined at the step 175 that the operations of the steps 175-179 are performed for all the step data. The teach data for the predetermined robot is completed when the operations of the steps 175-179 are completed for all the step data. Therefore, if the steps 175-179 are repeated for all the step data, then the computer 110 returns from the step 175 to the step 173 to produce the teach data of the next robot. When the teach data for all the robots are completed by repeating the steps 173-179, then the computer 110 proceeds from the step 173 to a step 180 to register the teach data.

The thus-prepared teach data 116 is transferred from the CAD computer 110 to the assembly line control unit 120 as shown in FIG. 8 after an examination to confirm the immunity from interference and other defects, with a display of the CAD computer 110 by which operating conditions are shown by a simulation based on the teach data.

The teach system of this embodiment employs the reverse conversion process 118, as shown by broken lines in FIG. 8. The reverse process is designed to correct faulty portions of the teach data to produce modified teach data 117 on the basis of the results of the above-mentioned simulation or the results of an actual experimental operation of the main body assembly system. The modified teach data 117 is used by the assembly line control unit 120 for actual production of vehicle bodies. Furthermore, the reverse conversion process 118 of this embodiment is designed to modify the standary motion pattern data 111 by producing a modified standard pattern data and comparing the original standard motion pattern data 111 with the modified pattern data.

When the reverse process is to be performed, the CAD computer 110 first proceeds from the step 171 to the step 181. At the step 181, the computer 110 reads the locating and welding position data 114, the above-mentioned original position data, the standard motion pattern data 11 and the original and modified versions 116 and 117 of the teach data. At the step 183, the computer 110 determines whether the motion sequence of each basic operation is equal between the original and modified versions 116 and 117 of the teach data. If it is not equal, the computer 110 modifies the motion sequence of the standard motion pattern data in conformity with the motion sequence of the modified version. At the step 185, the computer 110 determines the step numbers corresponding to each motion sequence are equal between the original and modified versions 116 and 117. If they are not equal, the computer 110 changes the step numbers of the standard motion pattern data in conformity with the numbers of the modified version 117. At the step 188, the computer 110 determines whether there is any additional step in the modified version 117. At the step 189, the computer 110 determines whether each step data is equal between the original and modified versions 116 and 117. If there is some additional step or some step data is not equal, the computer 110 proceeds to the step 190. At the step 190, the computer 110 calculates data of a new travel path by using the modified teach data 117, and modifies the standard motion pattern data by modification or addition of step data in accordance with the result of the calculation. Furthermore, the computer 110 copies the altered or added step I/O data and operating speed of the modified version to the altered or added step data. At the step 187, the computer 110 determined whether check of all the step data is completed or not. The modification of the standard motion pattern data of the specified robot is completed when the step 181-190 are repeated for all the steps of the step data. Therefore, the computer 110 returns from the step 187 to the step 182 to repeat the steps 182-190 for the next robot. The steps 182-190 are repeated until the motion pattern data is modified for all the robots. Then, the computer 110 proceeds from the step 182 to the step 191 to register the standard motion pattern data (replace the original version of the standard motion pattern data by the modified version).

In this embodiment, the locating and welding positions in the vehicle body are preliminarily determined at the time of the vehicle body design by CAD. At the time of provisional main body assembly, the teach system of this embodiment can cause the CAD computer to automatically produce the proper teach data of each robot by only specifying the vehicle kind and type of the vehicle to be assembled, and to transfer the thus-prepared teach data to the assembly line control unit. Therefore, the teach system of the embodiment can significantly reduce the time required for preparing the teach data of many robots, and the time for teaching the robots. Furthermore, the teach system of the embodiment can modify the standard motion pattern data 111 in accordance with the results of modification of the teach data. Therefore, the propriety of the teach data can be improved more and more by learning process as the preparation of the teach data is repeated.

In the present invention, it is possible to omit the reverse conversion process. Although the teach system of the illustrated embodiment employs three vehicle body types, it is possible to add one or more other types, or to subdivide any one or more of the vehicle body types. Furthermore, it is possible to employ robots of various other types (for example, articulated robots).

A second embodiment of the present invention is shown in FIGS. 12-15.

A vehicle body assembly system 201 is provided at a main body provisional assembly station of an assembly line. Workpieces, such as a main floor panel, left and right body side panels, a roof panel, a rear panel, a cowl top assembly and a shelf panel, are carried together into this provisional assembly station. There, the assembly system 201 positions these workpieces at predetermined relative positions so as to satisfy a predetermined assembly accuracy, and provisionally assembles these workpieces into a vehicle main body 202, like the assembly system of the first embodiment. The assembled main body 202 is carried from the provisional assembly station to a next station of the assembly line by a shuttle conveyor 203. At the stations following the provisional assembly station, the vehicle body is completed by additional shots of spot welding and addition of other panels.

The assembly system 201 has a frame structure 204, a plurality of robots 205, and an assembly robot control unit 206, like the assembly system of the first embodiment. The robots 205 are of an orthogonal type, and mounted on the frame structure 204. Each robot 205 has one or more tools at its hand portion. The tools of some robots are jigs (positioning tools) which are used for positioning a workpiece. In some robots, there is further provided a clamp device driven by an air cylinder, for holding a workpiece. The tools of some robots are welding guns.

Figure 12:
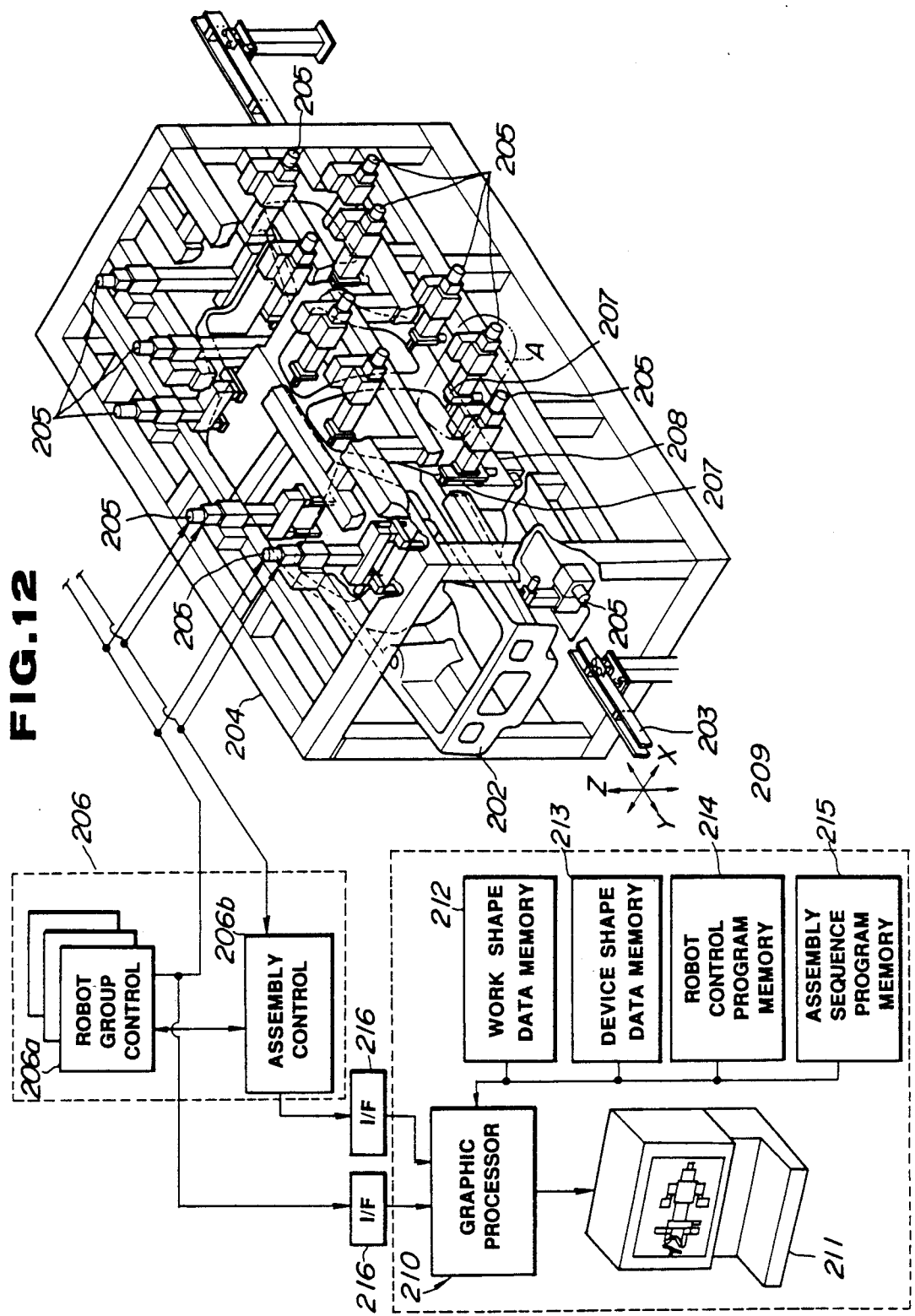
FIG. 12 is a view showing a vehicle assembly system and a display system according to a second embodiment of the present invention.
Figure 13:
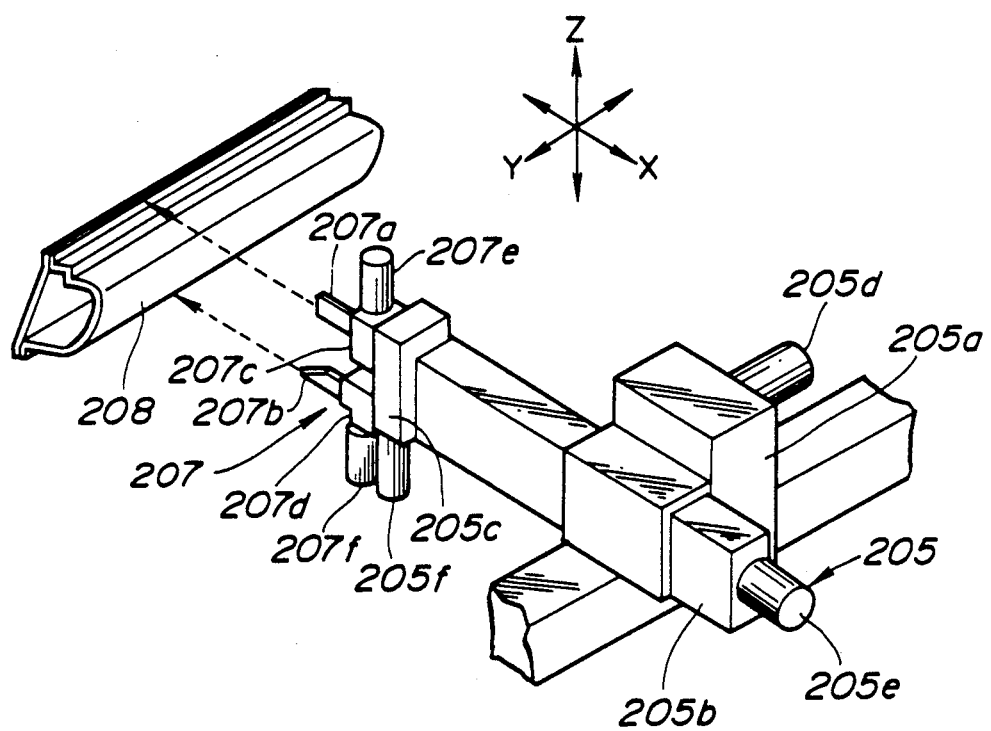
FIG. 13 is a perspective view showing one of assembling robots shown in FIG. 12.

FIG. 13 shows, as an example, the robot 205 which is encircled by a one dot chain line A in FIG. 12. This robot 205 is used for positioning a side sill portion of the body side panel. This robot 205 has linear motion mechanisms 205a, 205b, and 205c and servomotors 205d, 205e and 205f for driving the linear motion mechanisms, respectively. The linear motion mechanisms are of an ordinary type using a ball screw shaft and a ball nut. This robot carries a tool 207 which a jig. Under the command of the robot control unit 206, the robot can move the tool 207 along the Y axis which is horizontal and parallel to the longitudinal direction of the shuttle conveyor 203, the X axis which intersects the Y axis at right angles in a horizontal plane, and the vertical Z axis, to a predetermined locating position appropriate for positioning the side sill portion 208. Each of the other robots is constructed substantially in the same manner, and is capable of moving at least one tool the jig or the welding gun, along the X, Y and Z directions.

The jig 207 shown in FIG. 13 has first and second gauge plates 207a and 207b, a linear motion mechanism 207c having a ball screw shaft and a ball nut for moving the gauge plate 207a along the Z axis, a rotary motion mechanism 207d for rotating the gauge plate 207b in a vertical plane, and servomotors 207e and 207f for driving the motion mechanisms 207c and 207d, respectively. The robot 205 can vary the space between the first and second gauge plates 207a and 207b, and the angle of the gauge plate 207b, so that this robot is usable for side sills of various shapes. All the other robots are also adaptable to vehicle bodies of various types and various makes.

The robot control unit 206 has a plurality of robot group control sections 206a and an assembly control section 206b. In this embodiment, the robots 205 are classified into several groups according to their functions. For example, there are a group of robots for positioning the main floor panel, a group of robots for positioning the body side panels and a group of robots for welding. Each of the robot group control sections 206a is designed to control one of the robot groups. The assembly control section 206b is designed to control operations of the tools of the robots, to monitor the existence or absence of workpieces and operating conditions of the tools by using sensors provided in the tools, and to control the interlock among the robot group control sections 206a. The robot group control sections 206a control each robot according to a group control program for controlling one of the robot groups, and an individual robot control program for controlling one of the robots, which are prepared by using a CAD data about shapes of parts of the vehicle body prepared by a CAD system, data about shapes of parts of each robot, and data about a shape of each tool. The assembly control section 206b controls operations of the robot groups according to an assembly control program so designed as to perform operations of an assembly in a sequence corresponding to the structure of the main body 2.

In this assembly system 201, the workpieces are positioned and held at the predetermined positions relative to one another, and spot-welded together.

In the second embodiment, there is further provided an internal state display system 209 for making visible the internal states of the assembly system 201 while the main body is being actually assembled in the assembly system 201.

The display system 209 has graphic processor 210 having an ordinary CPU, a display unit 211 having a CRT, a work shape data memory 212, a device shape data memory 213, a robot control program memory 214, and an assembly sequence program memory 215. The work shape data memory 212 is a memory section for storing the CAD data describing a three dimensional shape of each vehicle body panel. The device shape data memory 213 is a memory section for storing shape data describing three dimensional shapes of various parts of the assembly system 201 such as the frame structure 204, the various portions of each robot 205, the jigs and the welding guns. The robot control program memory 214 is a memory section for storing the control programs for controlling the robots, preliminarily taken in from the robot group control sections 206a through an interface 216. The assembly sequence program memory 215 is a memory section for storing an assembly sequence program which is preliminarily taken in from the assembly control section 206b through an interface 216, and which is arranged to instruct the interlock of the robot groups, and sequences of operations of the jigs and welding guns.

Figure 14:
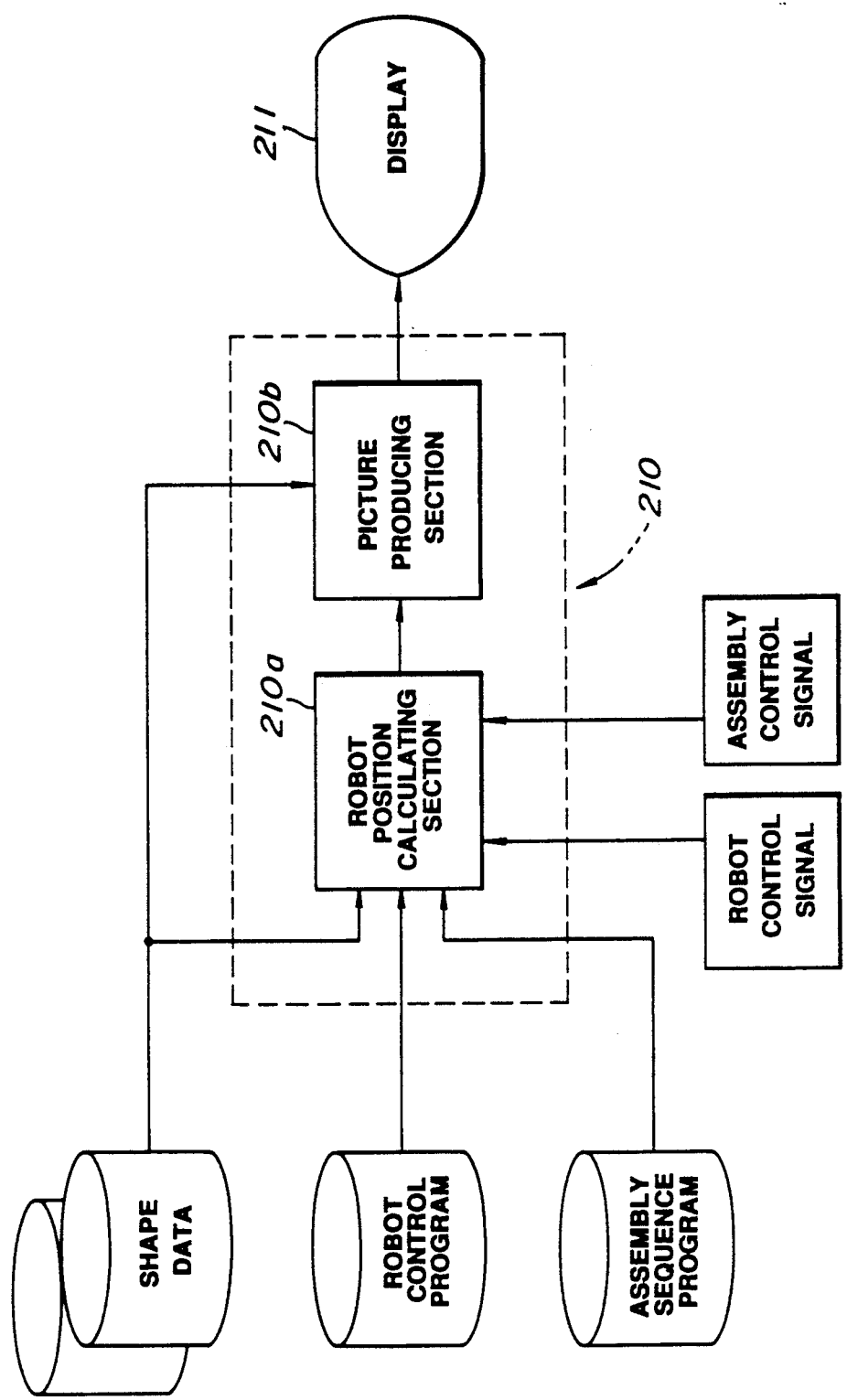
FIG. 14 is a block diagram showing a graphic processor of the display system according to the second embodiment.

As shown in FIG. 14, the graphic processor 210 has a robot position calculating section 210a and a picture producing section 210b. The robot position calculating section 210a reads the content of an operation currently being performed by the robot currently being examined, from the programs stored in the robot control program memory 214 and the assembly sequence program memory 215 in accordance with at least one robot control signal from the robot group control sections 206a and at least one assembly control signal from the assembly control section 206b. Furthermore, the robot position calculating section 210a reads the shape data describing the shapes of the various portions of the robot, from the device shape data memory 213. Then, the robot position calculating section 210a calculates current positions of the various portions of the robot by using the shape data and the content of the current operation (i.e. operating speed, starting position, and final position). The picture producing section 210b produces a graphic model picture image of each of the portions of the robot and the workpiece by using the shape data of the workpiece and the robot portions taken from the work shape data memory 212 and the device shape data memory 213. Then, the picture producing section 210b produces a composite graphic model picture image of the robot by superimposing the graphic model pictures of the various robot portions over one another by placing them at the respective current positions calculated by the calculating section 210a. Furthermore, the picture producing section 210b can superimpose the graphic model picture image of the tool at the forward portion of the robot arm, and the graphic model picture image of the workpiece at the predetermined position over the composite image. Then, the picture producing section 210b delivers picture image data of the finally obtained composite picture image, to the display unit 211.

Figure 15:
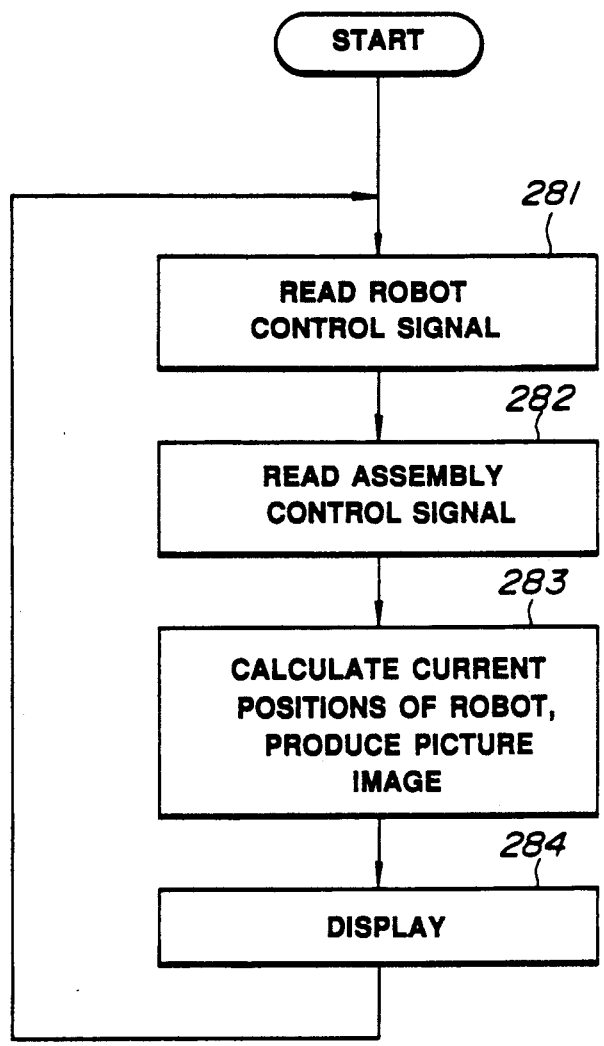
FIG. 15 is a flowchart showing a process performed by the graphic processor of the second embodiment.
Figure 16:
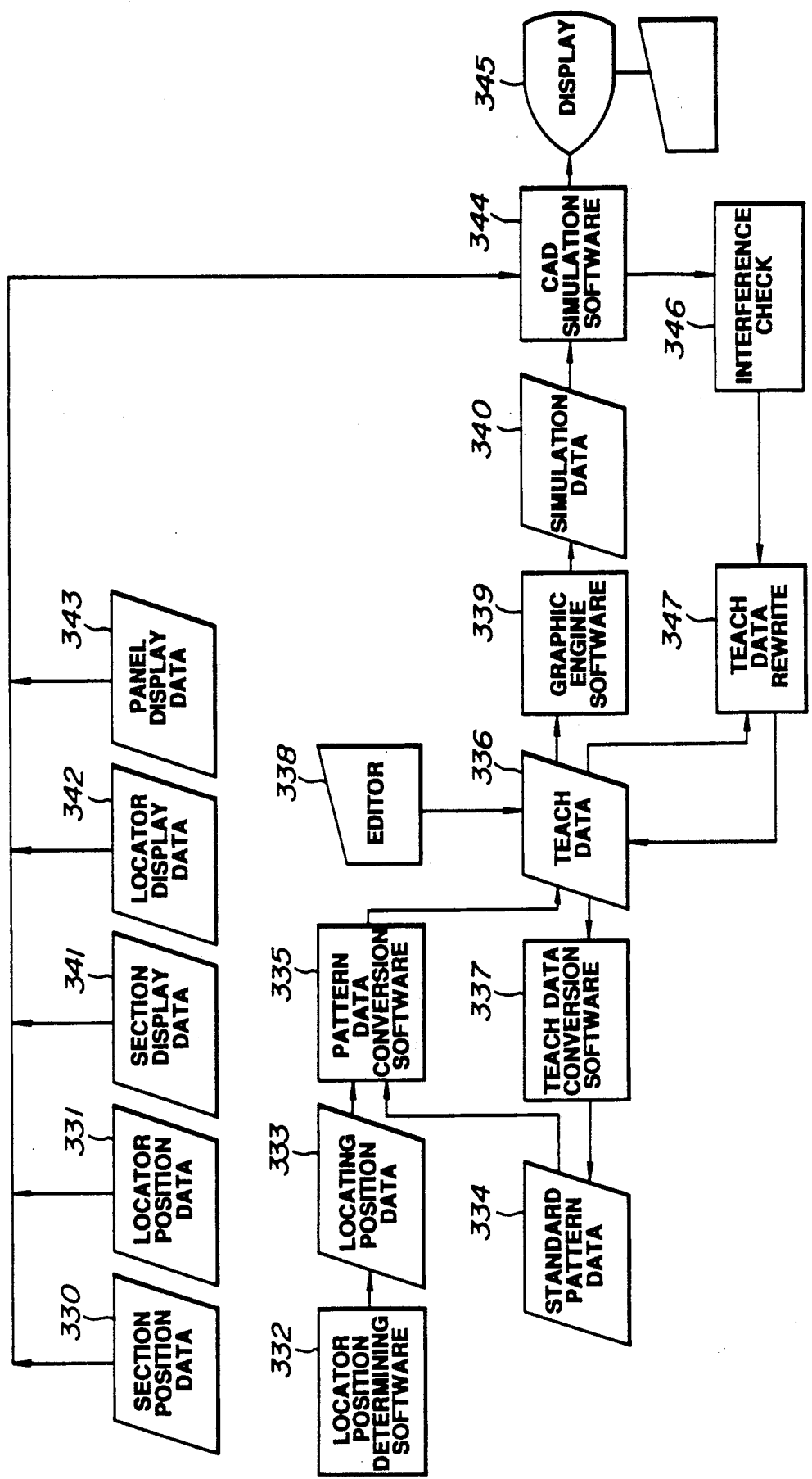
FIG. 16 is a schematic view showing a robot teaching system according to a third embodiment of the present invention.

The graphic processor 210 performs a procedure shown in FIG. 15 when the graphic processor 210 is instructed, before or during actual operation of the assembly system 201, to show a predetermined one or ones of the robots. At a first step 281, the graphic processor 210 reads the currently existing robot control signal directed to the designated robot, through the interface 216. At a next step 282, the graphic processor 210 reads the currently existing assembly control signal associated with the designated robot, through the interface 216. At a third step 283, the graphic processor 210 calculates the current positions of the portions of the designated robot and workpiece, and produces the composite graphic picture image of the designated robot and its surroundings. At a step 284, the graphic processor 210 cause the display unit 221 to exhibit the picture image, as shown in FIG. 12, by sending thereto the picture image data. This display system is capable of showing each robot in either one of the two dimentional and three dimentional representations. One of the two dimentional and three dimentional representations is selected according to the need.

In this way, the display system 209 of this embodiment makes it possible to observe the interior portions of the assembly system 201 during actual operation.

In this embodiment, it is possible to conform the conditions of the graphic model to the actual internal conditions by using output signals of various sensors provided within the assembly system.

A third embodiment of the present invention is shown in FIGS. 16-25.

FIGS. 21-24 show a vehicle body provisional assembly station of this embodiment, similar to those of the preceding embodiments. Parts constituting a vehicle body, such as a main floor panel, left and right body side panel, a roof panel, and a rear panel are assembled in a temporary manner into a vehicle body B by bending ends of these panels at a preceding station of the assembly line, and then the thus-assembled body B is carried into the provisional assembly station for spot welding by a shuttle bar (or transfer bar) 301.

In the provisional assembly station, a frame structure 303 surrounding the shuttle bar 301 is constructed on a foundation 302. A deck 5 is supported above the frame structure 303 by upright posts 304. A main controller 306 is installed on the deck 305. The deck 305 is provided with one or more ladders 307 for an operator to go up to the upper floor formed by the deck 5, and a safety fence 305a.

Figure 23:
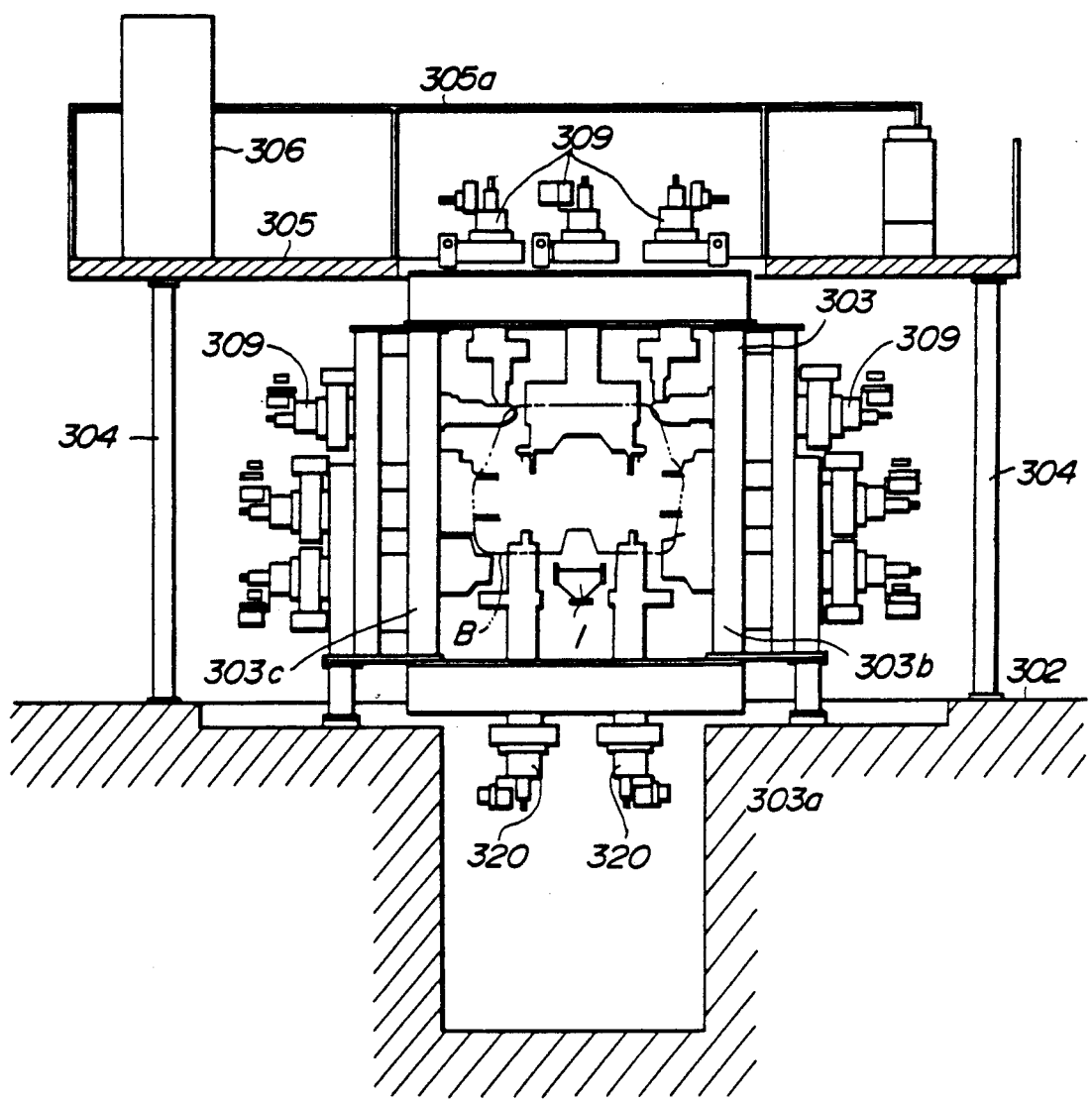
Figure 24:
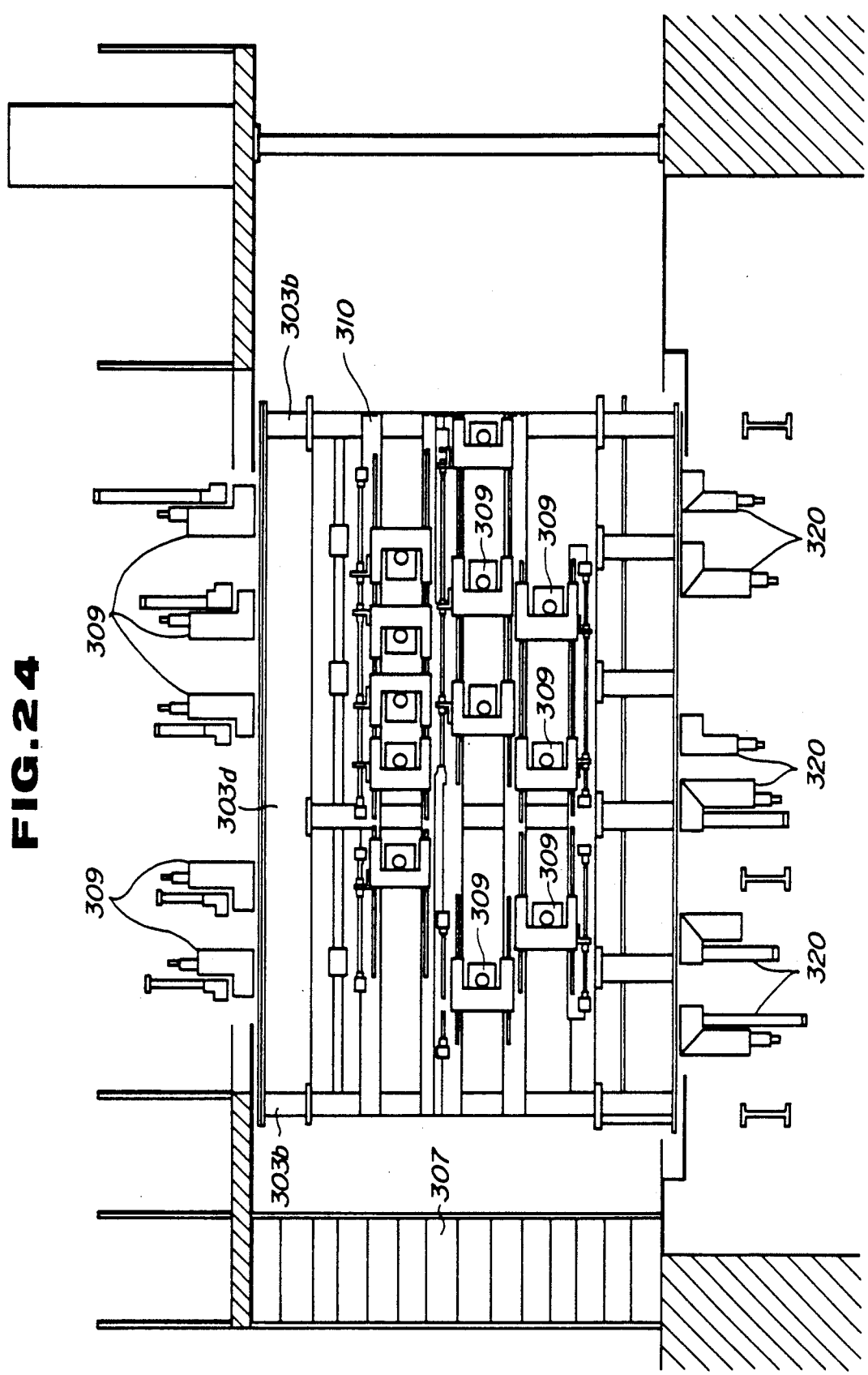
Figure 25:
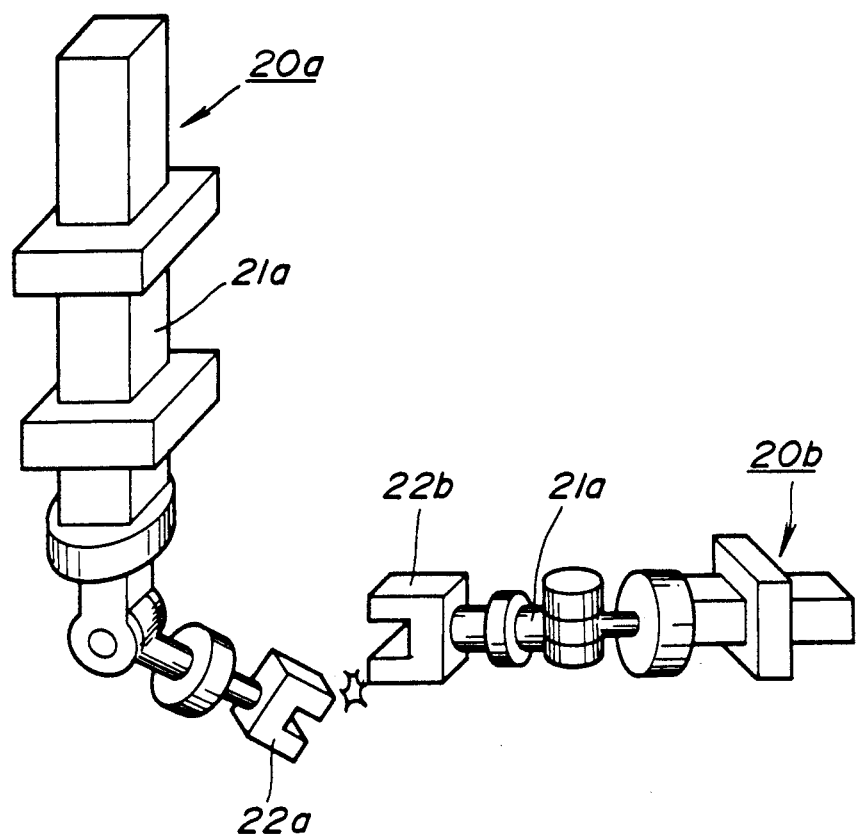
FIG. 25 is a perspective view for showing a robot-robot interference.

In a bottom 303a of the frame structure, there are provided a plurality of bottom robots 320 which are locators for positioning and supporting the vehicle body B, as shown in FIG. 23. A plurality of assemblying robots 309 are provided in the top and left and right sides of the frame structure 303. The frame structure 303 has a plurality of longitudinal guide rails 310 extending along the longitudinal Y axis parallel to the longitudinal direction of the shuttle bar 301. The assemblying robots 309 are movable along the guide rails 310. The assemblying robots 309 are used for assemblying the vehicle body by positioning, clamping and welding vehicle body panels. This vehicle assembly system is arranged to assemble vehicle bodies of different kinds and different types automatically by controlling the robots.

Figure 20:
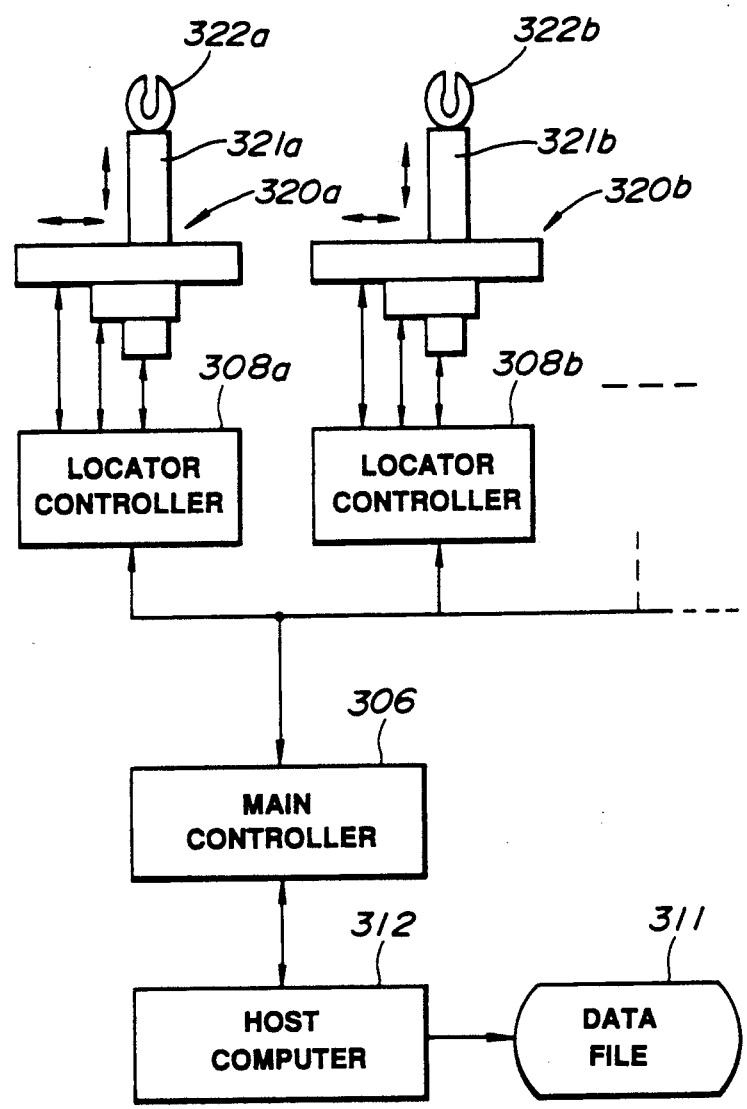
FIG. 20 is a schematic view showing a multiaxis control unit employed in the third embodiment.
Figure 21:
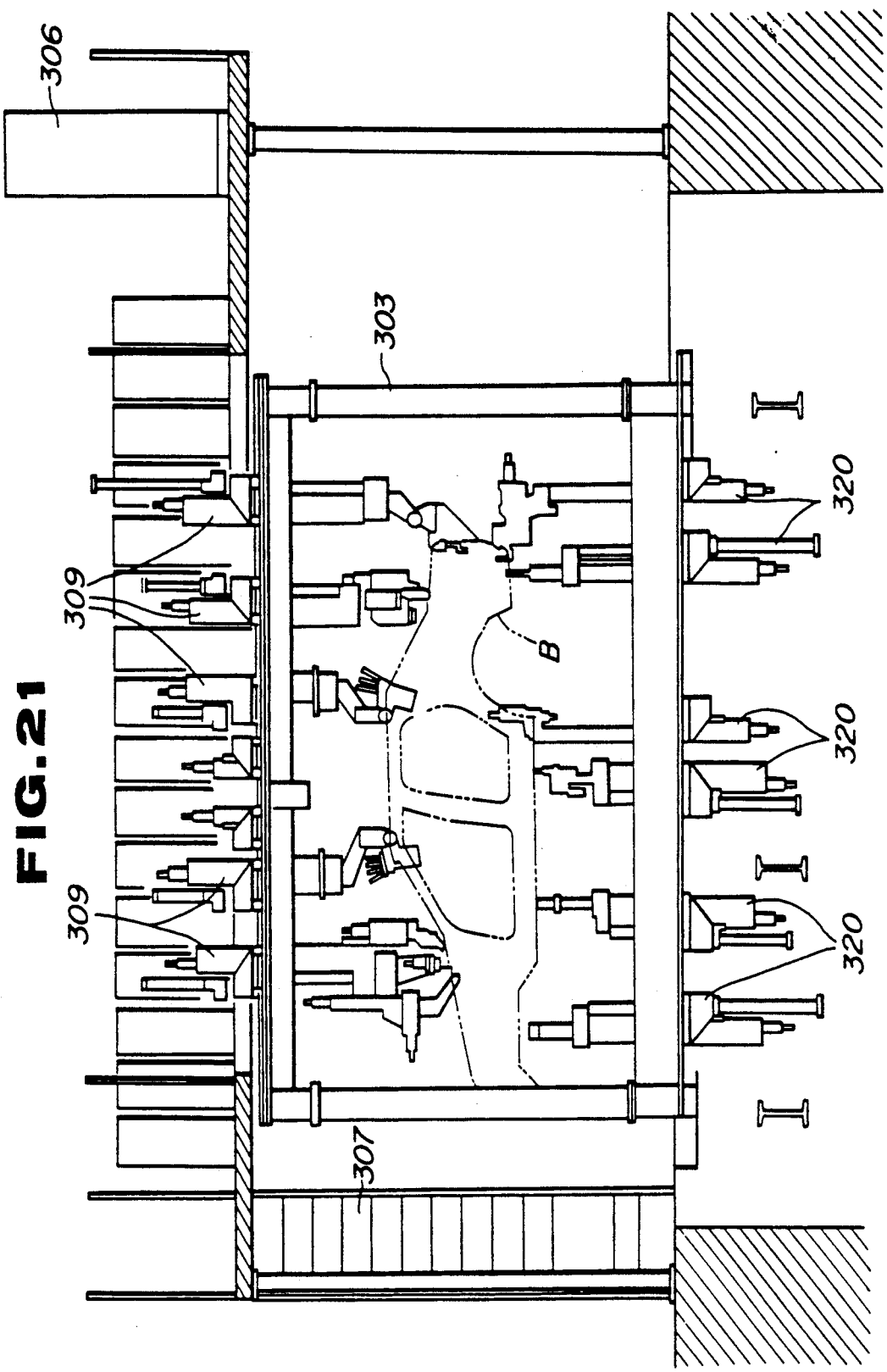
FIGS. 21-24 are view showing a vehicle body assembly system employed in the third embodiment.
Figure 22:
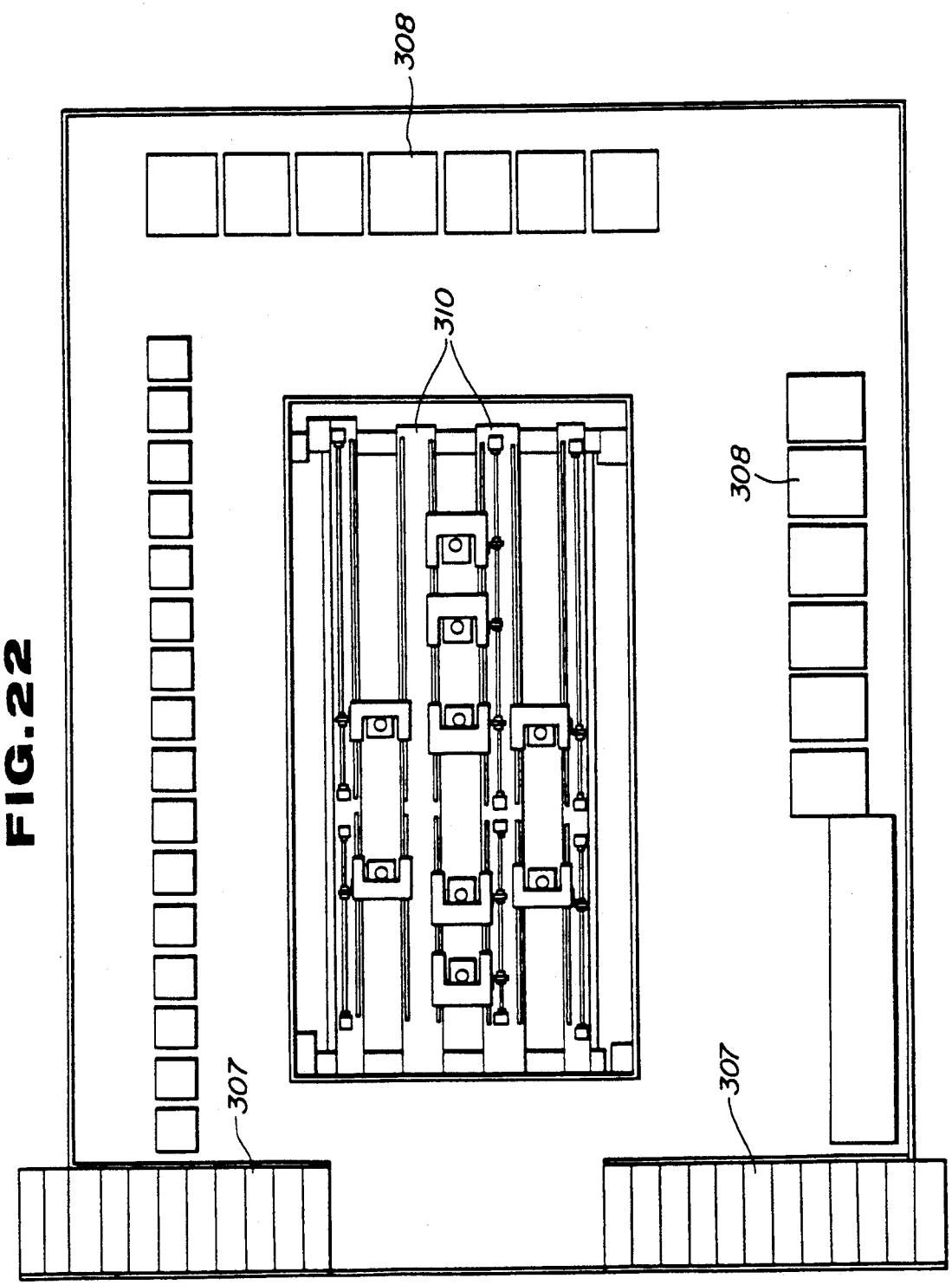

FIG. 20 shows two of the bottom robots, i.e. the positioning locators 320, by way of example. The locating positions are different according to the kind and type of a vehicle body to be assembled. Therefore, each locator 320 moves automatically along the X, Y and Z directions to a locating position adapted to the designated vehicle kind and type. In a multi-axis control system of this embodiment, the first and second positioning locators 320a and 320b taken as two examples in FIG. 20 are connected, respectively, first and second locator controllers 308a and 308b. The main controller 306 is connected with the locator controllers, and arranged to control data transmitted to the positioning locators 320. A host computer 312 is connected with the main controller 306 and a data file 311. The data file 311 takes the form of a storage device of a large capacity such as a magnetic drum storage or a hard disc storage. The data file 311 stores teach data describing paths (loca) and speeds of the robots which are preliminarily determined by a CAD simulation. The host computer 312 reads out the teach data from the data file 311, output data regarding start, stop and locating position of each robot, and controls the timings of actions of the robots and other devices.

FIGS. 16-19 show teaching system and method according to the third embodiment of the invention. In the process shown in FIG. 1, a locator position determining software 332 is arranged to perform calculation to determine a locating position data 333 by using a section position data 330 and a locator position data 331. The locating position data 333 is sent to a pattern data conversion software 335 together with a standard pattern data 334 which is information on paths between points of the data 333. The pattern data conversion software 335 outputs a teach data 336 by performing a conversion process. This teach data 336 is fed back to the standard pattern data 334 by a teach data conversion software 337 for performing a conversion of the teach data 336.

The teach data 336 is rearranged by an editor 338, and then converted into the form of a simulation data 340 by a graphic engine software. The simulation data 340 is sent to a CAD simulation software 344 together with a section display data 341, a locator display data 342 and a panel display data 343. The CAD simulation software 344 converts the input data into the form ready for display, and sends output data to a display unit 345 to show the result of the simulation.

On the other hand, an interference check software 346 checks the result of the simulation to determine whether there exists any interference among the robots and workpieces. If it is judged that some robot interferes with another robot or some workpiece, then a teach data rewrite software 347 takes in the teach data 336 and modifies the teach data 336 so as to eliminate the interference. The modified teach data is sent again to the softwares 339, 344 and 346.

Figure 17:
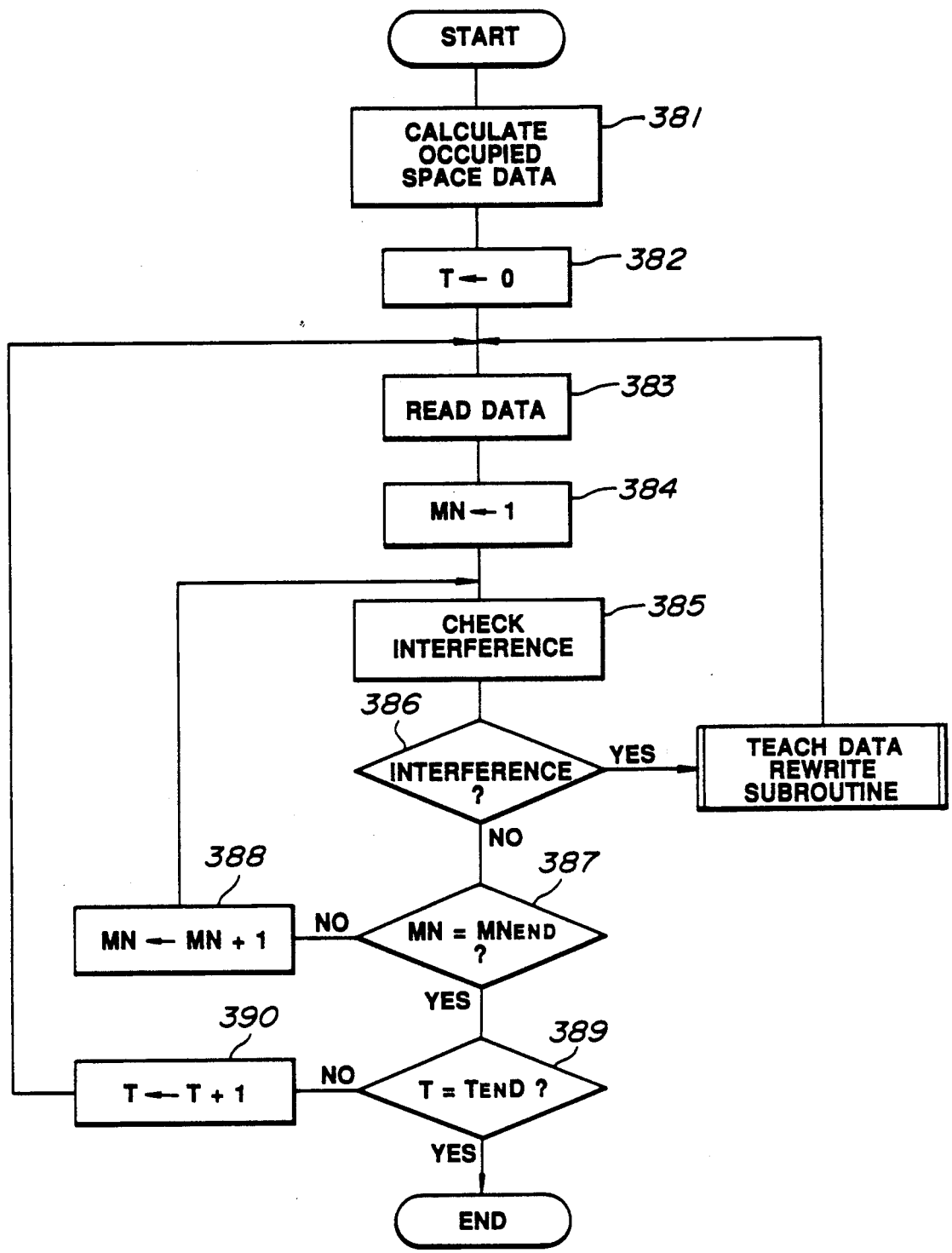
FIGS. 17 and 18 are flowcharts showing a main portion of the procedure according to the third embodiment.
Figure 18:
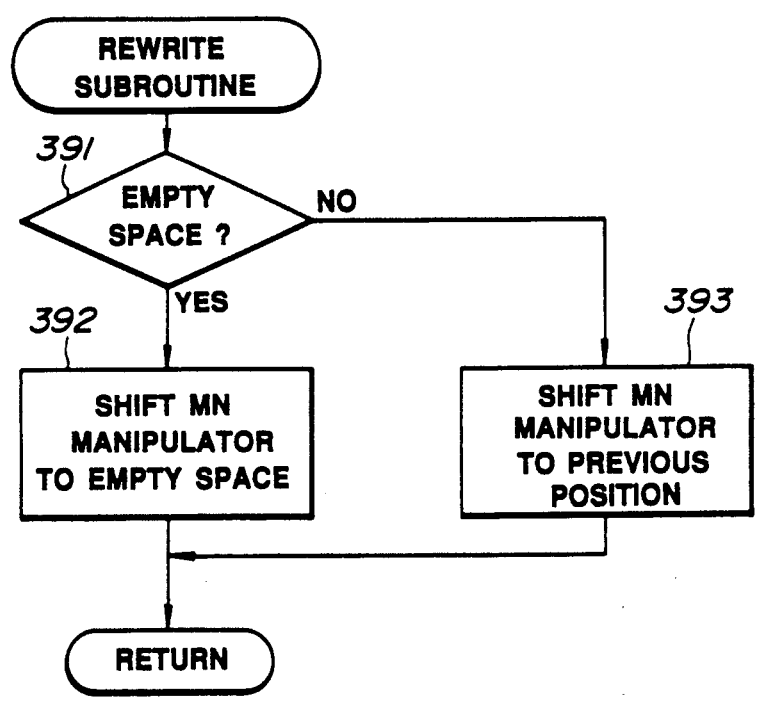

FIG. 17 and 18 shows mainly the processes of the interference check 346 and the teach data rewrite 347.

Figure 19:
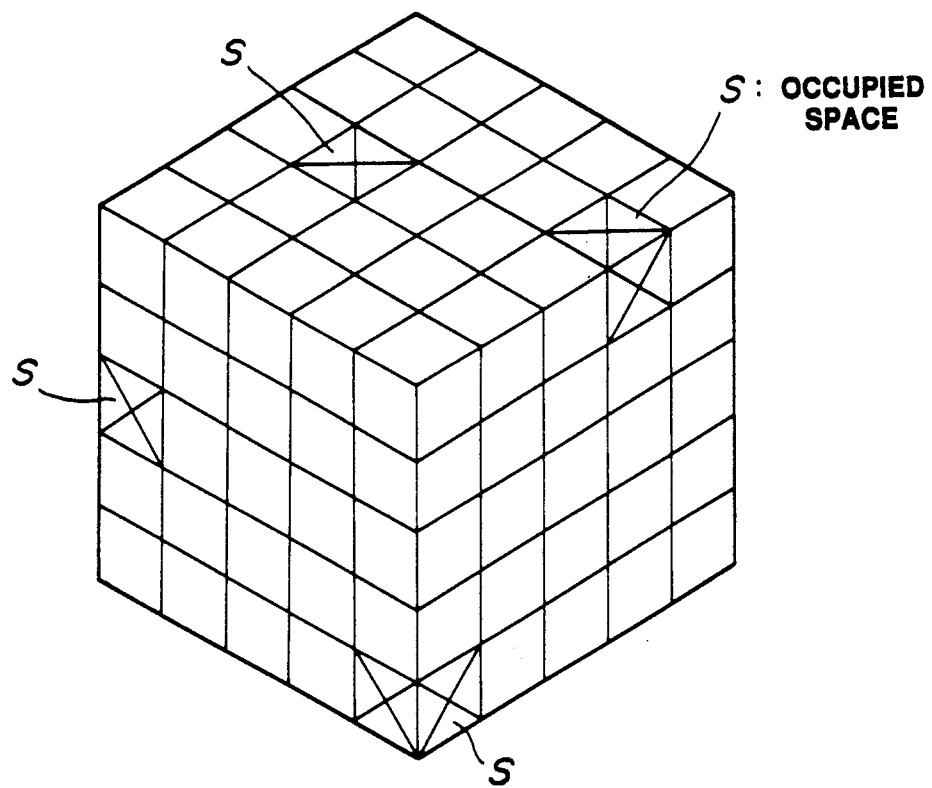
FIG. 19 is a view for illustrating the procedure of the third embodiment.

The teaching system of this embodiment first prepares a basic teach data for a manipulator of every robot. The basic teach data is data which describes a shortest path traveled by a predetermined portion of the manipulator 321 from the beginning to the end of each operation. This basic teach data is converted into a basic simulation data by the graphic engine software 339. By using the basic simulation data and the CAD simulation software 344, the teaching system calculates, at a step 381, data representing a space S occupied by the manipulator of each robot. The data of the occupied space S is a function of time and changing with time. In this embodiment, the space is divided into regularly arranged unit spaces (or cells) of the shape of a cube or a rectangular parallelpiped, as shown in FIG. 19. The teaching system indicates the unit spaces occupied space data which is changing with time. The teaching system prepares the occupied space data of each robot for all the operations, and stores it in a storage device of a CAD station.

At a step 382, the control unit of the teach system sets a time register T for measuring time, at zero. After the step 382 or a step 390 to increment the content of the time register T, the teaching control unit proceeds to a step 383 and there reads out the occupied space data of all the manipulators corresponding to an instant specified by the time register content T, that is, an end of the time length T staring from a reference time point. At a step 384, the teaching control unit sets a manipulator number of a manipulator number register equal to 1 to select one of the manipulators. After the step 384 or a step 388 for incrementing the manipulator number MN, the teaching control unit proceeds to a step 385. At the step 385, and a next step 386, the control unit determines whether there exists an interference of the manipulator specified by the manipulator number MN with the other manipulators by checking whether there is any overlap between the occupied space of the designated manipulator and the occupied spaces of the other manipulators. (The teach system may be arranged to further check interference between the designated manipulator and the workpieces in the same manner.)

If there is any interference, and accordingly the answer of the step 386 is affirmative, then the control unit proceeds to a teach data rewrite subroutine, and returns therefrom to the step 383. If the control unit judges that there is no interference, then the control is transferred to a step 387 at which the control unit determines whether the manipulator number MN is equal to a final manipulator number MNEND. If MN is not equal to MNEND, then the control unit increases MN by one at the step 388, and returns to the step 385 to check the manipulator of the next number. When MN becomes equal to MNEND, the control unit determines, at a step 389, whether the time register content T becomes equal to a predetermined time length TEND representing a time length required for all the operations. If T is not equal to TEND, then the control unit increments T at the step 390, and thereafter returns to the step 383. In this way, the control unit searches for interferences among all the manipulators (and the workpieces) from the beginning to the end of the assembly process at this assembly station until T becomes equal to TEND.

The above-mentioned teach data rewrite subroutine is shown in FIG. 18. If any interference is found and this subroutine is entered, the control unit determines, at a step 391, whether there is any empty cell (unit space) around the manipulator of the number MN. If there is an empty cell or empty cells enough to avoid the interference in the immediate vicinity of the manipulator, then the control unit changes the teach data, at a step 392, so as to move the space occupied by the manipulator of the number MN at that instant, to the closest empty space. In this way, the control unit avoid the interference by modifying the teach data. If there remains no empty space around the manipulator currently under examination, then the control unit proceeds from the step 391 to a step 393. At the step 393, the control unit changes the teach data so as to move the space currently occupied by the manipulator of the number MN, to the space which was occupied by this manipulator, a unit time ago, at the previous instant when the time register content was equal to T-1. Thus, the control unit postpones the movement of the manipulator of the number MN so as to prevent the coincidence in time, and cause the manipulators to occupy the same space asynchronously. After the step 392 or 393, the control unit returns to the step 383 of the main routine.

In this way, the teach system of the third embodiment can correct the teach data very easily.

What is claimed is:

1. A robot control system comprising:
   first storage means for storing position data elements;
   second storage means for storing motion pattern data elements; and
   teaching means for selecting one of said position data elements and one of said motion pattern data elements in accordance with a type of a work, preparing a teach data to teach motions to a robot by combining the selected one of said position data elements and the selected one of said motion pattern data elements, and teaching said robot,
   wherein said robot control system further comprises a machine structure including a plurality of robots for assembling workpieces into a vehicle body, said machine structure being capable of assembling vehicle bodies of different vehicle kinds and different vehicle body types, wherein each of said position data elements is a data element describing an operating position of one of said robots which is uniquely determined by one of said kinds and one of said types, and each of said motion pattern data elements is a data element describing a pattern of motions of one of said robots which is uniquely determined by one of said types, and wherein said teaching means selects one of said position data elements in accordance with both of a first identification signal discriminating said vehicle kinds, and a second identification signal discriminating said body types, and selects one of said motion pattern data elements in accordance with only said second identification signal.

2. A robot control system according to claim 1, wherein each of said motion pattern data elements is descriptive of a sequence of robot motions, and said teaching means prepares said teach data so as to cause one of said robots to move from a predetermined original position to the selected one of said operating positions by following said sequence of robot motions specified by the selected one of said motion pattern data elements.

3. A robot control system according to claim 2 wherein said system comprises first discriminating means for producing said first identification signal, and second discriminating means for producing said second identification signal, and said teaching means comprises first selecting means, connected with said first and second discriminating means, for selecting one of said position data elements, and second selecting means connected with said second discriminating means, for selecting one of said pattern data elements.

4. A robot control system according to claim 1 wherein said robot control system further comprises robot position calculating means for determining a position of said robot at a predetermined time instant, graphic model generating means for producing a graphic model of said robot by using said position of said robot determined by said robot position calculating means, and a robot shape data describing shapes of portions of said robots, and display means for making visible said graphic model of said robot.

5. A robot control system according to claim 4 wherein said graphic model generating means further produces a composite picture data to superimpose an image of said work on an image of said robot, by using said graphic model of said robot, and a graphic model of said work.

6. A robot control system according to claim 1 wherein said system further comprises third storage means for storing a first collection of data describing a first occupied space which is a space occupied by a first robot and moves with time, and a second collection of data describing a second occupied space which is a space occupied by a second robot and moves with time, and checking means for reading out data from said third storage means to determine said first and second occupied spaces at an arbitrary time instant, determining whether said first and second robots interfere with each other by using the data read out from said third storage means, and modifying a content of said third storage means if it is judged that there is an interference.

7. A robot controlling method comprising:
a first step of selecting one of robot position data elements and one of robot motion pattern data elements in accordance with a type of a work, and
a second step of preparing a teach data to teach motions to a robot by combining the selected one of said position data elements and the selected one of said motion data elements, and teaching said teach data to said robot,
wherein said robot position data elements are data elements describing different positions of said robot, respectively, used for assembling vehicle bodies of different vehicle kinds and different body types, and said robot motion pattern data elements are data elements describing pattern of motions of said robots which are used, respectively, for said different types, and wherein said first step is performed by selecting one of said position data elements in accordance with a first vehicle identification signal designating said type, and selecting one of said motion pattern data elements in accordance with only said second identification signal.

8. A vehicle body assembly system comprising:
a machine structure comprising a plurality of robots for assembling workpieces into a portion of a vehicle body;
robot controlling means for controlling said robots;
robot position calculating means connected with said robot controlling means, for determining a position of one of said robots at a predetermined time instant;
graphic model generating means for producing a graphic model of one of said robots by using said position of one of said robots determined by said robot position calculating mens, and a robot shape data describing shapes of portions of said robots; and
display means for making visible said graphic model of one of said robots.

9. A vehicle body assembly system according to claim 10 wherein said robot controlling comprises means for producing a robot control signal in accordance with a predetermined robot control program, and controlling one of said robots by sending said robot control signal, and said robot position calculating means comprises means for receiving said robot control signal, and determining the position of one of said robots using said control signal and said robot control program.

10. A robot teaching system comprising:
storage means for storing a first collection of data describing a first occupied space which is a space occupied by a first robot and moves with time, and a second collection of data describing a second occupied space which is a space occupied by a second robot and moves with time; and
checking means for reading out data from said storage means to determine said first and second occupied spaces at an arbitrary time instant, determining whether said first and second robots interfere with each other by suing the data read out form said storage means, and modifying a content of said storage means if it is judged that there is an interference.

* * * * *

UNITED STATES PATENT AND TRADEMARK OFFICE
CERTIFICATE OF CORRECTION

PATENT NO. : 4,998,050

DATED : March 5, 1991

INVENTOR(S) : Nishiyama et al

It is certified that error appears in the above-identified patent and that said Letters Patent is hereby corrected as shown below:

On the title page, item [22], "June 11, 1989" should be --June 13, 1989--.

Signed and Sealed this

Sixth Day of October, 1992

Attest:

DOUGLAS B. COMER

Attesting Officer

Acting Commissioner of Patents and Trademarks